(12) United States Patent
Shigiya et al.

(10) Patent No.: US 12,413,874 B2
(45) Date of Patent: Sep. 9, 2025

(54) PHOTOELECTRIC CONVERSION DEVICE, PHOTOELECTRIC CONVERSION SYSTEM, MOVING BODY, AND METHOD OF DRIVING PHOTOELECTRIC CONVERSION DEVICE

(71) Applicant: CANON KABUSHIKI KAISHA, Tokyo (JP)

(72) Inventors: Yoshiko Shigiya, Tokyo (JP); Noriyuki Shikina, Tokyo (JP); Atsushi Shimada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 164 days.

(21) Appl. No.: 18/497,101

(22) Filed: Oct. 30, 2023

(65) Prior Publication Data

US 2024/0155268 A1 May 9, 2024

(30) Foreign Application Priority Data

Nov. 4, 2022 (JP) .................. 2022-177363

(51) Int. Cl.
*H04N 25/76* (2023.01)
*H04N 25/53* (2023.01)
*H04N 25/533* (2023.01)
*H04N 25/78* (2023.01)

(52) U.S. Cl.
CPC ......... *H04N 25/7795* (2023.01); *H04N 25/53* (2023.01); *H04N 25/533* (2023.01); *H04N 25/78* (2023.01)

(58) Field of Classification Search
CPC .... H04N 25/53; H04N 25/533; H04N 25/704; H04N 25/7795; H04N 25/78
See application file for complete search history.

(56) References Cited

U.S. PATENT DOCUMENTS

| 7,821,571 | B2 | 10/2010 | Kitagata |
| 8,305,473 | B2 | 11/2012 | Takenaka |
| 10,389,964 | B2 | 8/2019 | Taniguchi |
| 10,645,316 | B2 | 5/2020 | Shigiya |

(Continued)

FOREIGN PATENT DOCUMENTS

| JP | 2007-104241 A | 4/2007 |
| JP | 2009-188732 A | 8/2009 |
| JP | 2021-034963 A | 3/2021 |

*Primary Examiner* — Lin Ye
*Assistant Examiner* — Chriss S Yoder, III
(74) *Attorney, Agent, or Firm* — Venable LLP

(57) ABSTRACT

A photoelectric conversion device including pixels, a scanning circuit and a controller is provided. The scanning circuit performs a driving operation including a first scan of causing the pixels to start an accumulation operation and a second scan of reading out signals from the pixels. The second scan includes first and second driving operations that are different in a length of a readout period. The controller is configured to supply, to the scanning circuit, a first synchronization signal for controlling the first scan and a second synchronization signal for controlling the second scan. A relationship between a cycle of the first synchronization signal and the second synchronization signal in the first driving operation and a cycle of the first synchronization signal and the second synchronization signal in the second driving operation is a non-integer multiple or a non-integral submultiple.

18 Claims, 14 Drawing Sheets

(56) References Cited

U.S. PATENT DOCUMENTS

| | | | |
|---|---|---|---|
| 10,659,713 B2 | 5/2020 | Shikina | |
| 11,202,023 B2 | 12/2021 | Shigiya | |
| 11,303,829 B2 * | 4/2022 | Shigiya | ................. H04N 25/40 |
| 11,490,041 B2 | 11/2022 | Shigiya | |
| 11,595,606 B2 | 2/2023 | Shikina | |
| 11,627,264 B2 | 4/2023 | Igarashi | |
| 11,700,467 B2 | 7/2023 | Shikina | |
| 11,758,296 B2 | 9/2023 | Shikina | |
| 2007/0085921 A1 * | 4/2007 | Kitagata | ................ H04N 25/46 |
| | | | 348/E3.019 |
| 2011/0007173 A1 | 1/2011 | Takenaka et al. | |
| 2021/0067717 A1 | 3/2021 | Shigiya et al. | |
| 2023/0209217 A1 | 6/2023 | Shimada | |
| 2023/0395629 A1 | 12/2023 | Matsuyama | |

* cited by examiner

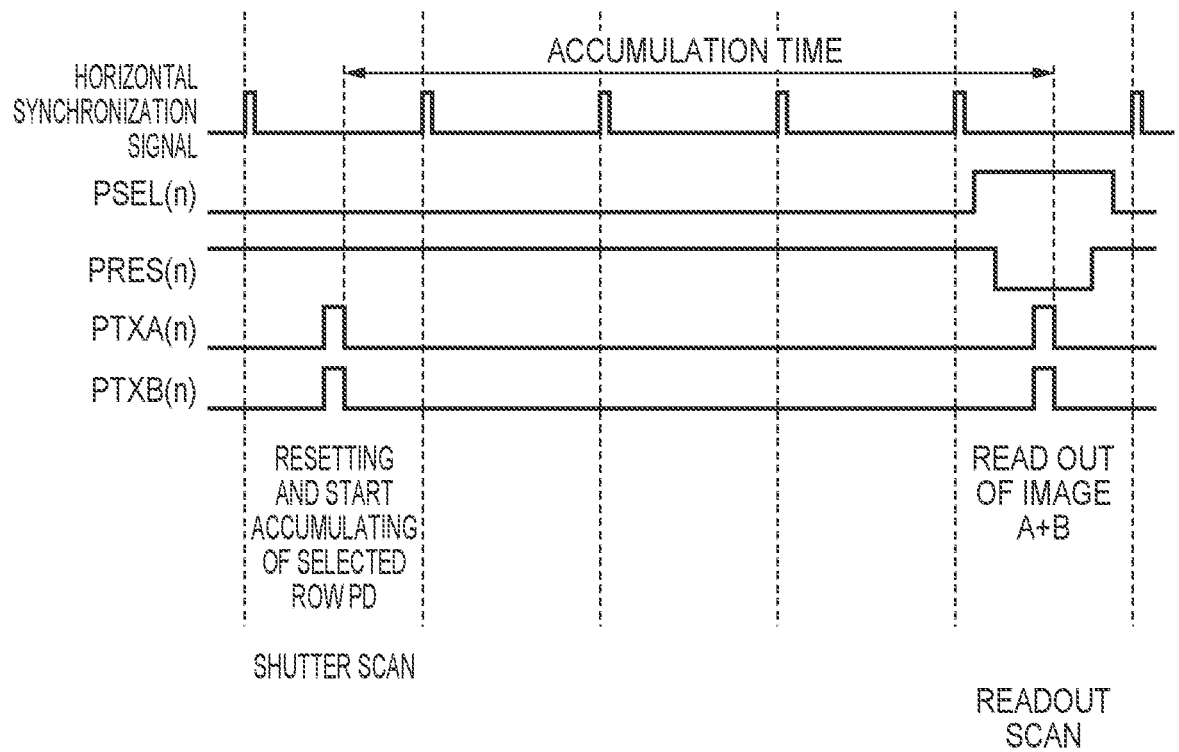
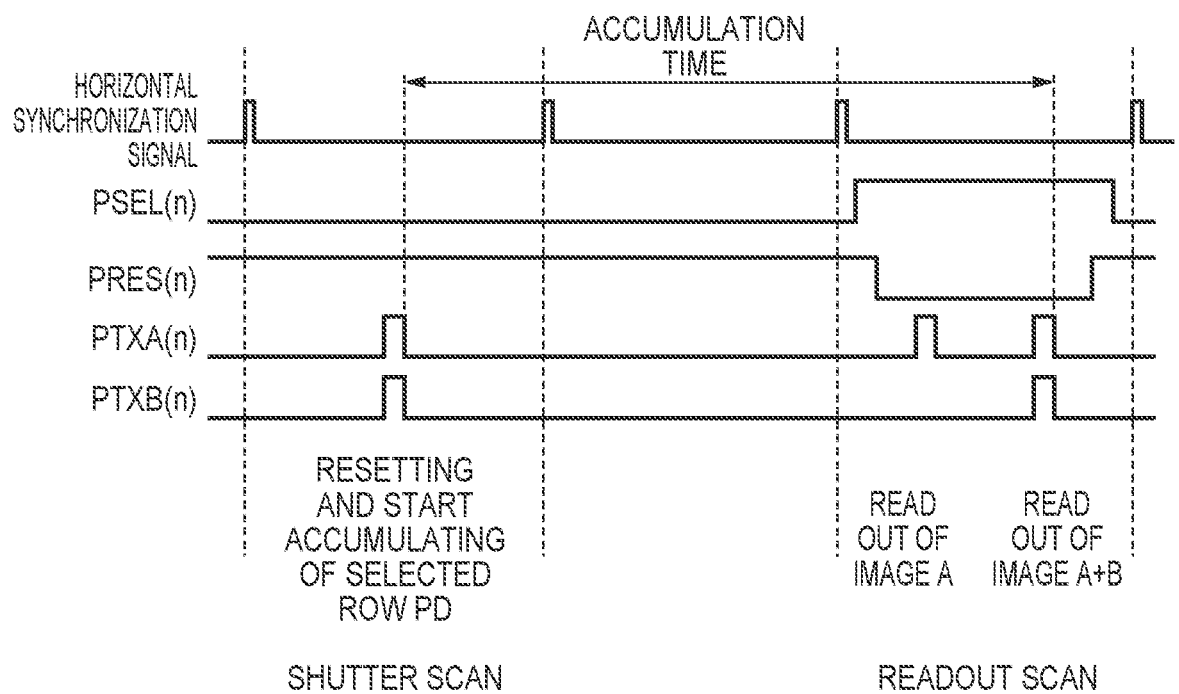

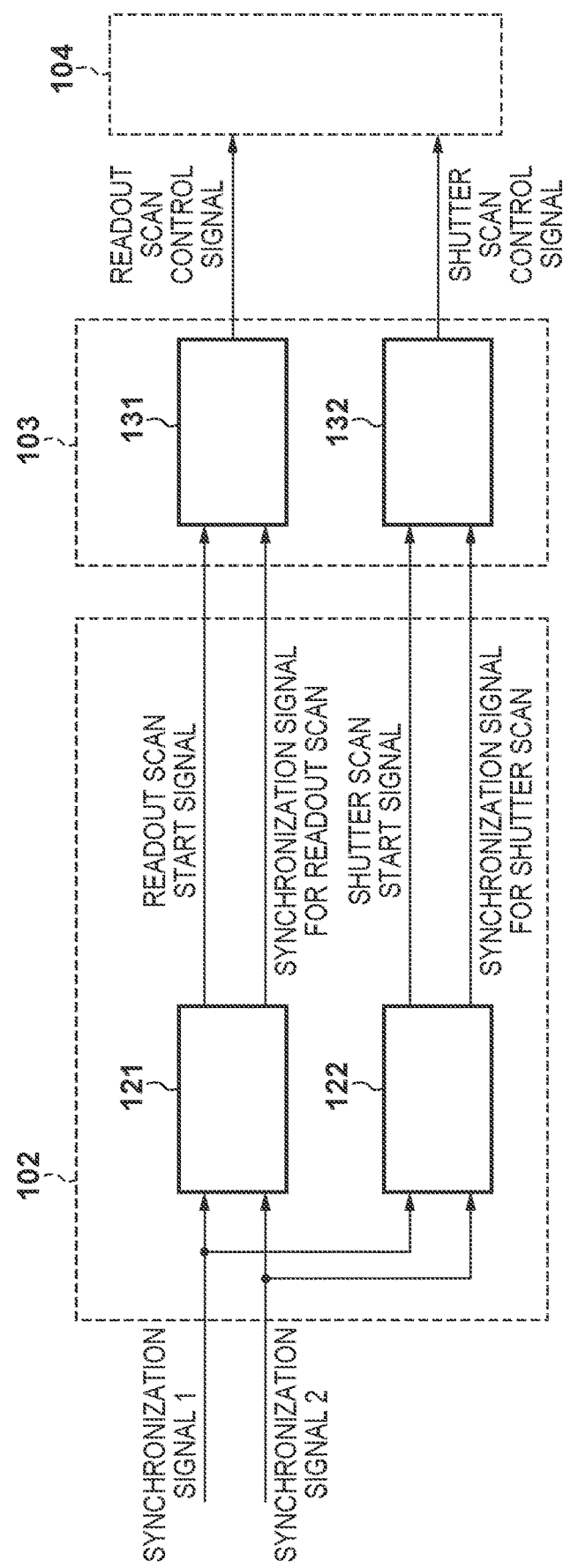

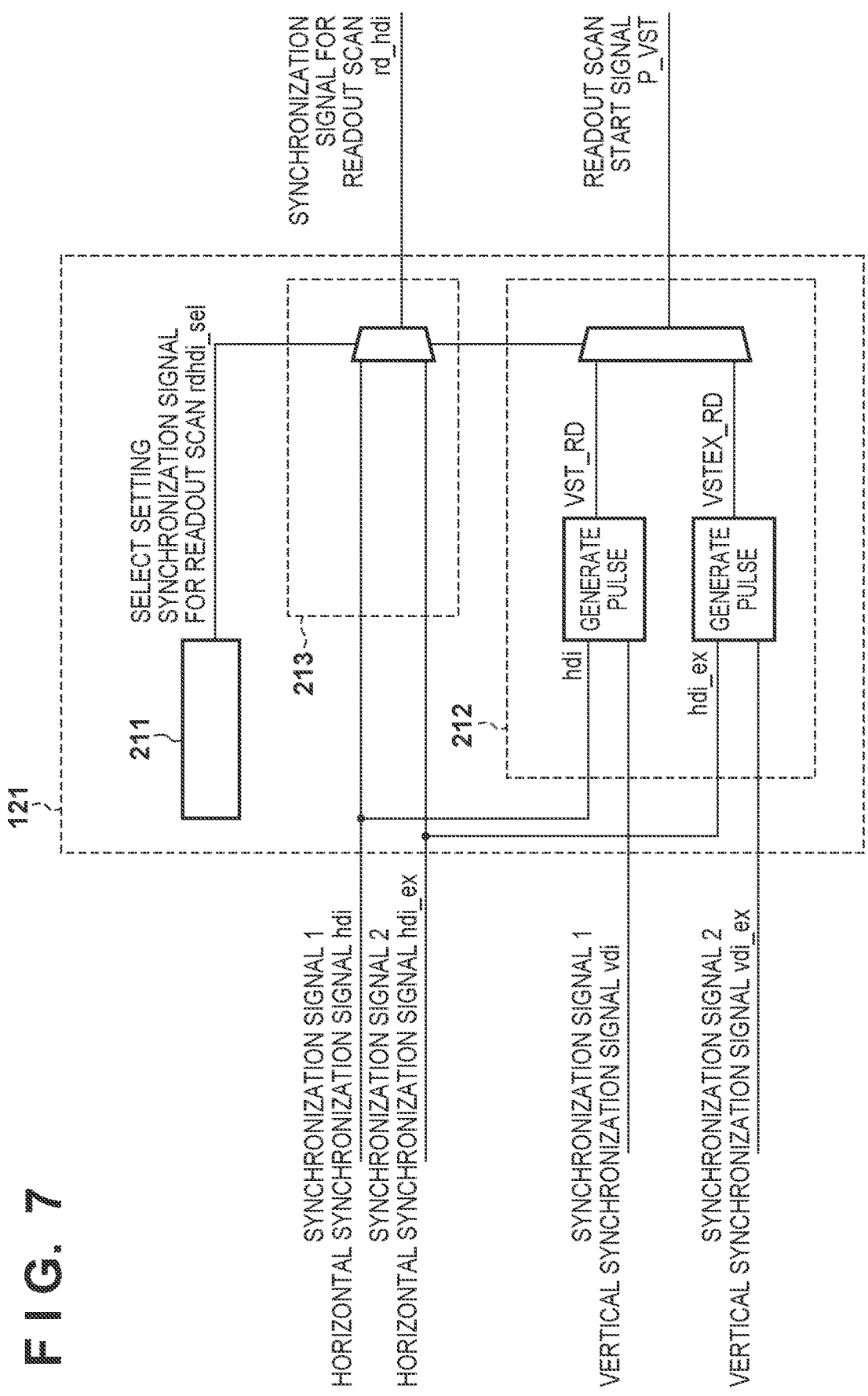

PHOTOELECTRIC CONVERSION DEVICE, PHOTOELECTRIC CONVERSION SYSTEM, MOVING BODY, AND METHOD OF DRIVING PHOTOELECTRIC CONVERSION DEVICE

BACKGROUND OF THE INVENTION

Field of the Invention

The present invention relates to a photoelectric conversion device, a photoelectric conversion system, a moving body, and a method of driving the photoelectric conversion device.

Description of the Related Art

Japanese Patent Laid-Open No. 2021-034963 describes an image capturing apparatus that can switch among a plurality of driving methods of different readout times when continuously acquiring a plurality of images.

SUMMARY OF THE INVENTION

In Japanese Patent Laid-Open No. 2021-034963, a plurality of pixels arranged in a photoelectric conversion unit are scanned on a row basis in a cycle that is n times (n is an integer of 1 or more) the cycle of a horizontal synchronization signal input to a control unit. Therefore, the scan of the photoelectric conversion unit depends on the cycle of the horizontal synchronization signal, and cannot be set to an optimum (shortest) cycle in each driving method, thereby impeding an increase in the speed of driving.

Some embodiments of the present invention provide a technique advantageous in increasing the speed of a photoelectric conversion device.

According to some embodiments, a photoelectric conversion device comprising a plurality of pixels arranged to form a plurality of rows, a scanning circuit configured to drive the plurality of pixels, and a control circuit, wherein the scanning circuit is configured to perform a driving operation including a first scan of causing the plurality of pixels to start an accumulation operation on a row basis and a second scan of reading out signals from the plurality of pixels on a row basis after the first scan, the driving operation includes a first driving operation and a second driving operation that are different in a length of a readout period of signals from one row in the second scan, the control circuit is configured to supply, to the scanning circuit, a first synchronization signal for controlling the first scan and a second synchronization signal for controlling the second scan, and a relationship between a cycle of the first synchronization signal and the second synchronization signal supplied from the control circuit to the scanning circuit in the first driving operation and a cycle of the first synchronization signal and the second synchronization signal supplied from the control circuit to the scanning circuit in the second driving operation is a relationship of a non-integer multiple or a non-integral submultiple is provided.

According to some other embodiments, a photoelectric conversion device comprising a plurality of pixels each including a photoelectric conversion element and arranged to form a plurality of rows, a scanning circuit configured to drive the plurality of pixels, and a control circuit, wherein the scanning circuit is configured to perform a driving operation including a first scan of causing the plurality of pixels to start an accumulation operation on a row basis and a second scan of reading out signals from the plurality of pixels on a row basis after the first scan, the driving operation includes a first driving operation and a second driving operation that are different in a length of a readout period of signals from one row in the second scan, the control circuit is configured to supply, to the scanning circuit, a first synchronization signal for controlling the first scan and a second synchronization signal for controlling the second scan, the scanning circuit is configured to drive the plurality of pixels on a row basis every time the first synchronization signal is supplied from the control circuit in the first scan, and at the time of switching the driving operation from the first driving operation to the second driving operation, the control circuit is configured to switch, in accordance with a start of the first scan in the second driving operation, a cycle in which the first synchronization signal is supplied is provided.

According to still other embodiments, a method of driving a photoelectric conversion device including a plurality of pixels arranged to form a plurality of rows and a scanning circuit configured to drive the plurality of pixels, comprising: performing a driving operation including a first scan, performed by the scanning circuit, of causing the plurality of pixels to start an accumulation operation on a row basis, and a second scan, performed by the scanning circuit, of reading out signals from the plurality of pixels on a row basis after the first scan; and supplying, to the scanning circuit, a first synchronization signal for controlling the first scan and a second synchronization signal for controlling the second scan, wherein the driving operation includes a first driving operation and a second driving operation that are different in a length of a readout period of signals from one row in the second scan, and a relationship between a cycle of the first synchronization signal and the second synchronization signal supplied to the scanning circuit in the first driving operation and a cycle of the first synchronization signal and the second synchronization signal supplied to the scanning circuit in the second driving operation is a relationship of a non-integer multiple or a non-integral submultiple is provided.

According to further embodiments, a method of driving a photoelectric conversion device including a plurality of pixels each including a photoelectric conversion element and arranged to form a plurality of rows, and a scanning circuit configured to drive the plurality of pixels, comprising: performing a driving operation including a first scan, performed by the scanning circuit, of causing the plurality of pixels to start an accumulation operation on a row basis, and a second scan, performed by the scanning circuit, of reading out signals from the plurality of pixels on a row basis after the first scan; and supplying, to the scanning circuit, a first synchronization signal for controlling the first scan and a second synchronization signal for controlling the second scan, wherein the driving operation includes a first driving operation and a second driving operation that are different in a length of a readout period of signals from one row in the second scan, the scanning circuit drives the plurality of pixels on a row basis every time the first synchronization signal is supplied in the first scan, and the driving operation is switched from the first driving operation to the second driving operation by switching, in accordance with a start of the first scan in the second driving operation, a cycle in which the first synchronization signal is supplied is provided.

Further features of the present invention will become apparent from the following description of exemplary embodiments (with reference to the attached drawings).

BRIEF DESCRIPTION OF THE DRAWINGS

FIG. 4 is a timing chart showing an example of the operation of the photoelectric conversion device shown in FIG. 1;

FIG. 5 is a timing chart showing an example of the operation of the photoelectric conversion device shown in FIG. 1;

FIG. 6 is a block diagram showing an example of the arrangement of a control circuit and a scanning circuit of the photoelectric conversion device shown in FIG. 1;

FIG. 7 is a block diagram showing an example of the arrangement of a readout control circuit of the photoelectric conversion device shown in FIG. 1;

DESCRIPTION OF THE EMBODIMENTS

Figure 1:
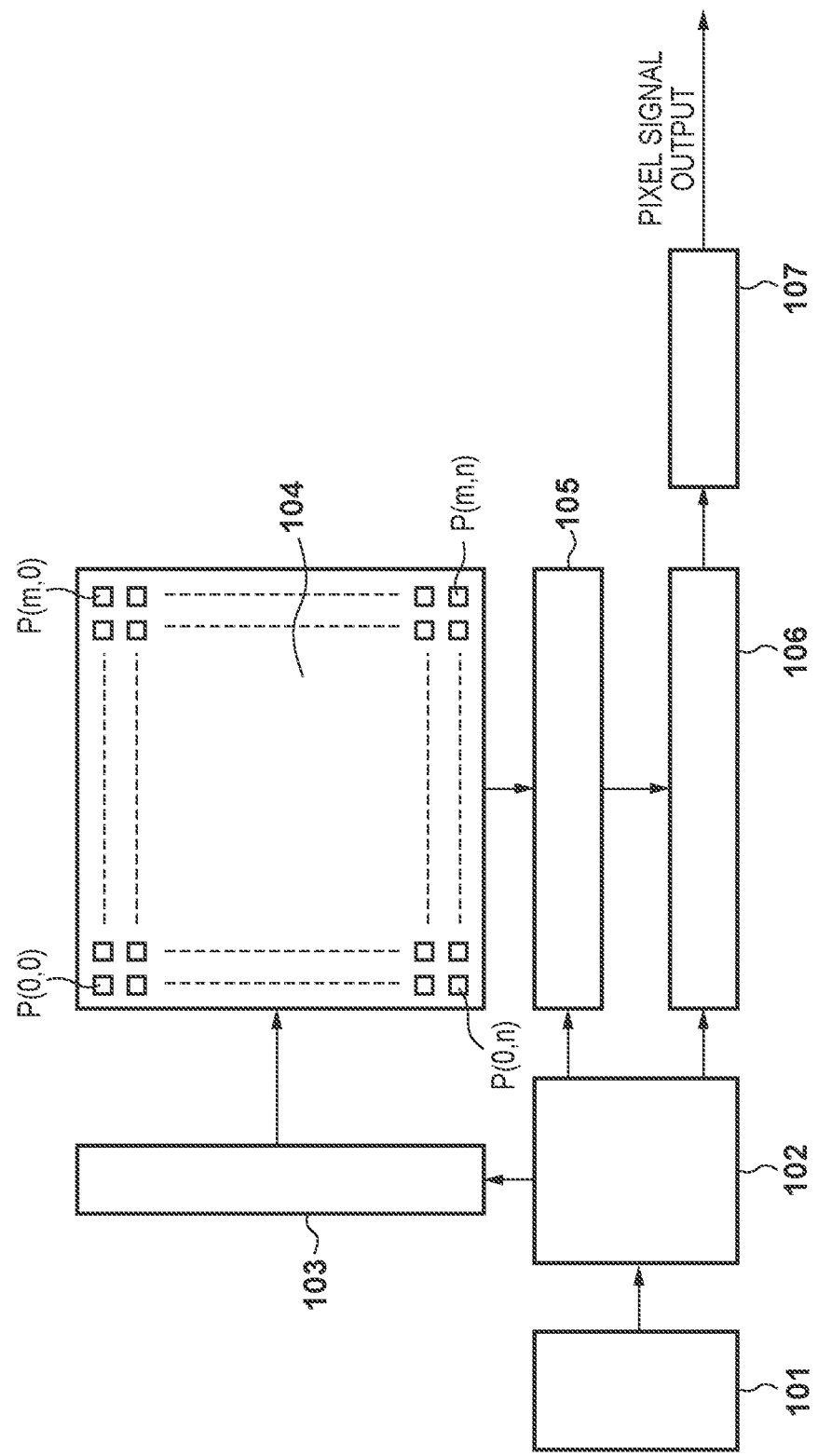
FIG. 1 is a block diagram showing an example of the arrangement of a photoelectric conversion device according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

A photoelectric conversion device according to an embodiment of the present disclosure will be described with reference to FIGS. 1 to 13. FIG. 1 is a block diagram schematically showing an example of the arrangement of a photoelectric conversion device 100 according to this embodiment. The photoelectric conversion device 100 includes a CPU 101, a control circuit 102, a scanning circuit 103, a pixel unit 104, a column circuit 105, a scanning circuit 106, and a signal output circuit 107.

The CPU 101 controls the overall photoelectric conversion device 100. The control circuit 102 operates upon receiving a control signal such as a synchronization signal and a setting signal of an operation mode or the like supplied from the CPU 101. It can be said that the control circuit 102 controls respective components including the scanning circuit 103, the pixel unit 104, the column circuit 105, the scanning circuit 106, and the signal output circuit 107 arranged under the control circuit 102 in the photoelectric conversion device 100. In this embodiment, the CPU 101 is arranged in the photoelectric conversion device 100 but the present invention is not limited to this. For example, the CPU 101 need only be arranged in a photoelectric conversion system incorporating the photoelectric conversion device 100. That is, the CPU 101 may be arranged outside the photoelectric conversion device 100. In this case, it can be said that the control circuit 102 controls the overall photoelectric conversion device 100.

In the pixel unit 104, a plurality of pixels P are arranged to form a plurality of rows and a plurality of columns. In the arrangement shown in FIG. 1, a plurality of pixels P(0, 0) to P(m, n) are arranged over (n+1) rows and (m+1) columns in the pixel unit 104. In this example, the row direction indicates the horizontal direction (for example, the direction in which the pixels P(0, 0) to P(m, 0) are arranged) in FIG. 1. The column direction indicates the vertical direction (for example, the direction in which the pixels P(0, 0) to P(0, n) are arranged) in FIG. 1. Furthermore, the subscripts in parentheses of the pixel P(m, n) indicate the column number and the row number, respectively. Assume that the row number of the first row is 0, and the column number of the first column is 0.

The scanning circuit 103 operates upon receiving a signal supplied from the control circuit 102. The scanning circuit 103 performs a driving operation including a shutter scan of the pixel unit 104 and a readout scan following the shutter scan. The shutter scan is an operation of causing the plurality of pixels P to start an accumulation operation on a row basis by resetting, with respect to the pixels P of some or all of the rows arranged in the pixel unit 104, photoelectric conversion elements arranged in the pixels P and ending the reset. The shutter scan can also be called an electronic shutter scan, an electronic front curtain shutter scan, or the like. The readout scan is an operation of sequentially reading out, with respect to the pixels P of some or all of the rows of the pixel unit 104, signals based on charges accumulated in the photoelectric conversion elements arranged in the pixels P from the plurality of pixels P on a row basis. As described above, the scanning circuit 103 is a circuit for driving the plurality of pixels P. The scanning circuit 103 can also be called a vertical scanning circuit or the like.

The column circuit 105 can include an amplification circuit, an analog-to-digital conversion (A/D conversion) circuit, and a memory. The column circuit 105 amplifies a signal input from the pixel unit 104, A/D-converts the amplified signal, and holds the signal as a digital signal in the memory.

The scanning circuit 106 operates upon receiving a signal supplied from the control circuit 102. The scanning circuit 106 sequentially scans the signals held in the memory of the column circuit 105, and transfers the signals to the signal output circuit 107. The scanning circuit 106 can include a multiplexer. The scanning circuit 106 can also be called a horizontal scanning circuit or the like.

The signal output circuit 107 can include a digital processing unit, a parallel/serial conversion circuit, and an output circuit such as a Low Voltage Differential Signaling (LVDS) circuit. The signal output circuit 107 performs digital processing of a signal output from the scanning circuit 106, and outputs the signal as serial data to the outside of the photoelectric conversion device 100.

This embodiment has explained the arrangement in which the column circuit 105 includes the A/D conversion circuit, and A/D-converts a signal input from the pixel unit 104 but the present invention is not limited to this. It is not essential for the column circuit 105 to have an A/D conversion function. For example, the signal output from the pixel unit 104 may be VD-converted outside the photoelectric conversion device 100. In this case, the arrangement of the scanning circuit 106 and the signal output circuit 107 can appropriately be changed so as to adapt to analog signal processing.

Figure 2:
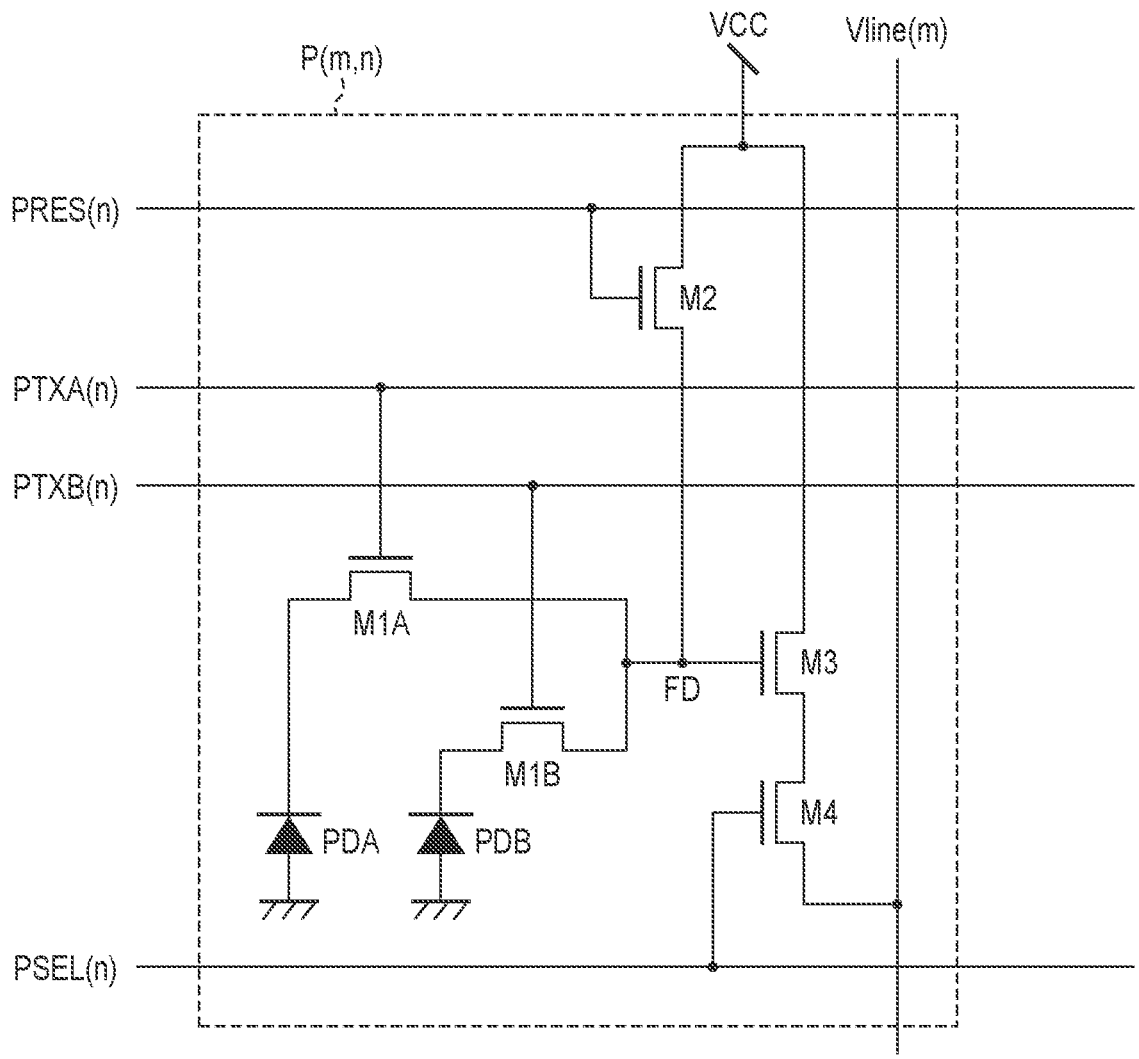
FIG. 2 is a circuit diagram showing an example of the arrangement of a pixel of the photoelectric conversion device shown in FIG. 1.

FIG. 2 is a circuit diagram showing an example of the arrangement of the pixel P according to this embodiment. The pixel P(m, n) represents a pixel arranged on the mth column and the nth row of the pixel unit 104. The pixel P includes two photodiodes PDA and PDB as photoelectric conversion elements. The pixel P can further include a floating diffusion FD, two transfer transistors M1A and M1B, a reset transistor M2, an amplification transistor M3, and a selection transistor M4.

Each of the photodiodes PDA and PDB performs photoelectric conversion to generate charges corresponding to incident light. In accordance with a control signal PTXA, the transfer transistor M1A transfers the charges generated by the photodiode PDA to the floating diffusion FD as the input node of the amplification transistor M3. In accordance with a control signal PTXB, the transfer transistor M1B transfers the charges generated by the photodiode PDB to the floating diffusion FD as the input node of the amplification transistor M3. The floating diffusion FD stores the charges of the photodiodes PDA and PDB transferred via the transfer transistors M1A and M1B, respectively. In accordance with a control signal PRES, the reset transistor M2 resets the voltage of the floating diffusion FD to a predetermined voltage (a voltage VCC in the arrangement shown in FIG. 2). The amplification transistor M3 outputs, to a vertical output line Vline via the selection transistor M4, a signal based on the potential of the floating diffusion FD that varies in accordance with the transferred charges.

Each of the drains of the reset transistor M2 and the amplification transistor M3 is electrically connected to the power supply VCC. The source of the amplification transistor M3 is electrically connected to a current source (not shown) via the selection transistor M4 and the vertical output line Vline, and operates as a source follower circuit. This allows the amplification transistor M3 to output, to the vertical output line Vline via the selection transistor M4 that operates in accordance with a control signal PSEL, a signal corresponding to the potential of the floating diffusion FD connected to the gate terminal.

By simultaneously setting the reset transistor M2 and the transfer transistor M1A in the conductive state, the photodiode PDA is reset. By simultaneously setting the reset transistor M2 and the transfer transistor M1B in the conductive state, the photodiode PDB is reset.

In the arrangement shown in FIG. 2, the transfer transistors M1A and M1B, the reset transistor M2, the amplification transistor M3, and the selection transistor M4 can be formed by n-channel transistors. However, the present invention is not limited to this. Some or all of the transfer transistors M1A and M1B, the reset transistor M2, the amplification transistor M3, and the selection transistor M4 may be formed by p-channel transistors.

A control signal PTXA(n) is a signal for controlling the transfer transistors M1A arranged on the nth row of the pixel unit 104, and is input to the gates of the transfer transistors M1A. A control signal PTXB(n) is a signal for controlling the transfer transistors M1B arranged on the nth row of the pixel unit 104, and is input to the gates of the transfer transistors M1B. A control signal PRES(n) is a signal for controlling the reset transistors M2 arranged on the nth row of the pixel unit 104, and is input to the gates of the reset transistors M2. A control signal PSEL(n) is a signal for controlling the selection transistors M4 arranged on the nth row of the pixel unit 104, and is input to the gates of the selection transistors M4.

In the following description, assume that each of the transfer transistors M1A and M1B, the reset transistor M2, the amplification transistor M3, and the selection transistor M4 is set in the conductive state when the signal input to the gate is at high level, and is set in the non-conductive state when the signal is at low level. Assume also that high level corresponds to a logical value "1" and low level corresponds to a logical value "0".

Figure 3:
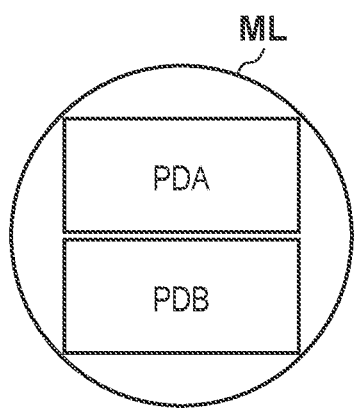
FIG. 3 is a view showing the relationship between a PD and a microlens of the pixel shown in FIG. 2.

FIG. 3 shows a schematic plan view of the pixel P shown in FIG. 2. More specifically, FIG. 3 shows the positional relationship between a microlens ML and the photodiodes PDA and PDB as the photoelectric conversion elements in each pixel P. In each pixel P, the photodiodes PDA and PDB share one microlens ML. That is, each of the photodiodes PDA and PDB receives light having passed through the one microlens ML. A signal obtained by reading out the charges received by each of the photodiodes PDA and PDB can be used for, for example, focusing.

FIG. 4 is a timing chart showing an example of driving of the pixel P shown in FIG. 2. By simultaneously setting the control signals PTXA(n), PTXB(n), and PRES(n) at high level, the photodiodes PDA and PDB are reset. Next, by setting the control signals PTXA(n) and PTXB(n) at low level, the photodiodes PDA and PDB start accumulation (an accumulation operation) of charges. By performing the above operation for each row, the above-described shutter scan is performed.

After the start of the accumulation operation, by setting the control signal PRES(n) at low level and simultaneously setting the control signals PTXA(n), PTXB(n), and PSEL(n) at high level, a signal is read out from the photodiodes PDA and PDB, and the accumulation operation is ended. By performing the above operation for each row, the above-described readout scan is performed. The accumulation time of charges in the photodiodes PDA and PDB is the time from when the reset of the photodiodes PDA and PDB is canceled until the readout of the signal ends.

FIG. 5 is a timing chart showing an example of driving of the pixel P shown in FIG. 2, which is different from the timing chart shown in FIG. 4. By simultaneously setting the control signals PTXA(n), PTXB(n), and PRES(n) at high level, the photodiodes PDA and PDB are reset. Next, by setting the control signals PTXA(n) and PTXB(n) at low level, the photodiodes PDA and PDB start accumulation (an accumulation operation) of charges.

After the start of the accumulation operation, by setting the control signal PRES(n) at low level and simultaneously setting the control signals PTXA(n) and PSEL(n) at high level, a signal photoelectrically converted by the photodiode PDA is read out. In FIG. 5, "readout of image A" is described. Next, by simultaneously setting the control signals PTXA(n), PTXB(n), and PSEL(n) at high level, a signal photoelectrically converted by the photodiodes PDA and PDB is read out, and the accumulation of the charges is ended. In FIG. 5, "readout of image A+B" is described, similar to FIG. 4. The accumulation time of charges in the photodiodes PDA and PDB is the time from when the reset of the photodiodes PDA and PDB is canceled until the readout of the signal ends.

In the driving example shown in FIG. 5, a signal generated by the photodiode PDA out of the two photodiodes PDA and PDB that share the one microlens ML, and a signal generated by both the two photodiodes PDA and PDB are read out. On the other hand, in the driving example shown in FIG. 4, not a signal generated by the photodiode PDA out of the two photodiodes PDA and PDB that share the one microlens ML but a signal generated by both the two photodiodes PDA and PDB is read out. In the driving example shown in FIG. 5, since a signal is read out from the photodiodes PDA and PDB by the operation divided into two times, the length of the readout period of the signals is long, as compared with driving shown in FIG. 4. Therefore, in driving shown in FIG. 5, the cycle of the horizontal synchronization signal is long, as compared with driving shown in FIG. 4.

A case where the photoelectric conversion device 100 that can perform a plurality of kinds of driving operations switches among the driving operations is considered. For example, if a signal is desirably read out from the pixel P at high speed, driving shown in FIG. 4 is selected, and if focusing is desirably performed, driving shown in FIG. 5 is selected. That is, the driving operation including the shutter scan and the readout scan executed by the scanning circuit 103 includes the driving operation shown in FIG. 4 and the driving operation shown in FIG. 5 that are different in length of the readout period of the signals from one row in the readout scan. In this case, the photoelectric conversion device 100 may switch between the driving operations. To switch the driving operation, it is necessary to switch between the cycles of the synchronization signals for controlling the shutter scan and the readout scan.

FIG. 6 is a block diagram showing an example of the arrangement of the control circuit 102 and the scanning circuit 103 of the photoelectric conversion device 100 according to this embodiment. Synchronization signals of two systems are input to the control circuit 102. The control circuit 102 generates a start signal and a synchronization signal for controlling the shutter scan and a start signal and a synchronization signal for controlling the readout scan, and supplies them to the scanning circuit 103. The control circuit 102 can include a readout control circuit 121 and a shutter control circuit 122.

FIG. 7 is a block diagram showing an example of the arrangement of the readout control circuit 121. The readout control circuit 121 includes a register control circuit 211, a timing control circuit 212, and an internal synchronization signal generation circuit 213, and generates a readout scan start signal and a synchronization signal for the readout scan. The register control circuit 211 holds settings concerning the readout scan. The timing control circuit 212 generates a timing signal necessary for the readout scan, such as a readout scan start signal. The internal synchronization signal generation circuit 213 switches the cycle of the synchronization signal for the readout scan in accordance with the readout scan settings. More specifically, synchronization signals 1 and 2 of two systems are input to the control circuit 102, as described above. A horizontal synchronization signal hdi of synchronization signal 1 and a horizontal synchronization signal hdi_ex of synchronization signal 2 are supplied to the internal synchronization signal generation circuit 213 arranged in the readout control circuit 121 of the control circuit 102. The internal synchronization signal generation circuit 213 switches the cycle of the synchronization signal for the readout scan by selecting the synchronization signal for the readout scan from the horizontal synchronization signals hdi and hdi_ex in accordance with the readout scan settings.

Figure 8:
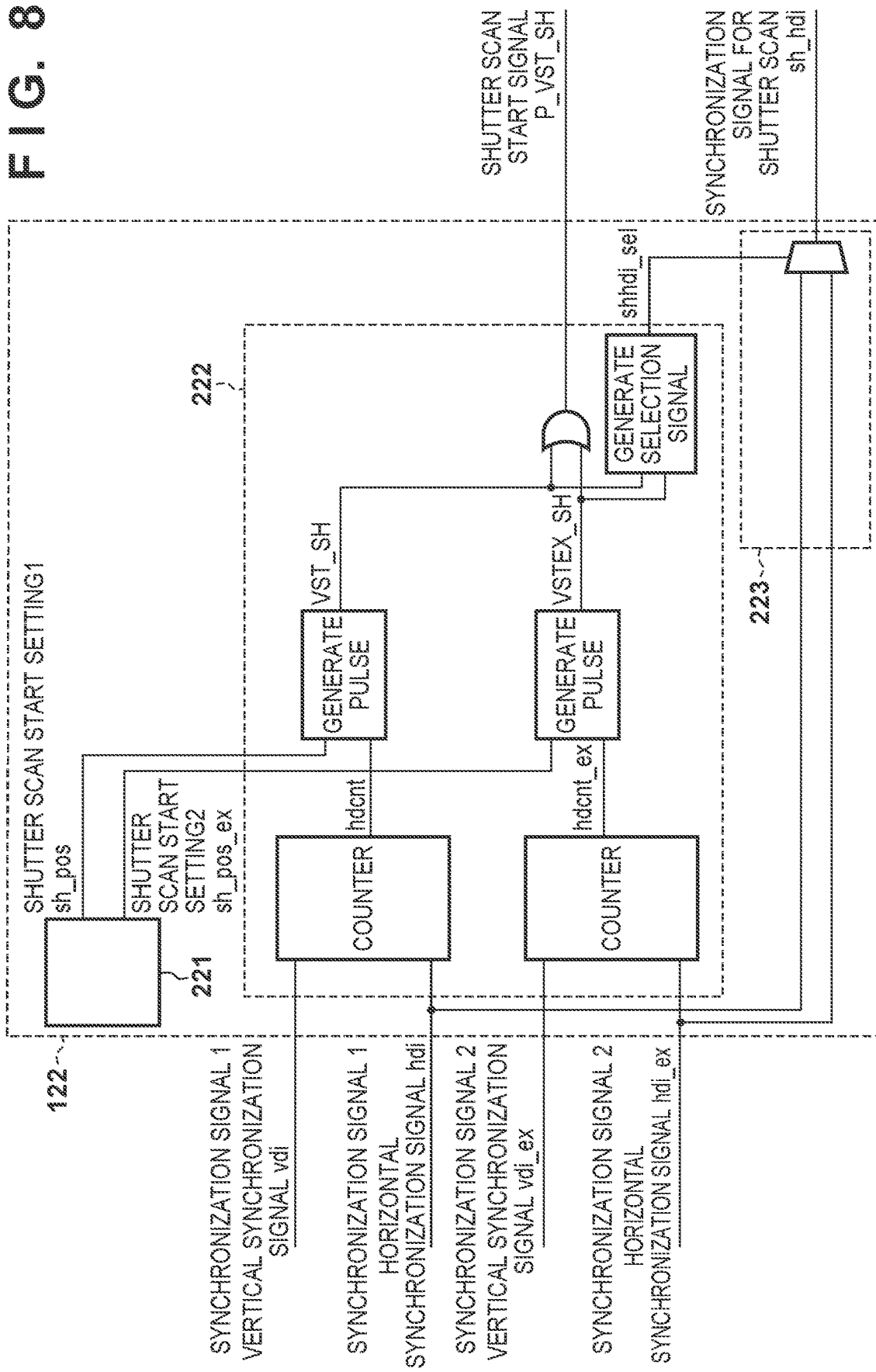
FIG. 8 is a block diagram showing an example of the arrangement of a shutter control circuit of the photoelectric conversion device shown in FIG. 1.

FIG. 8 is a block diagram showing an example of the arrangement of the shutter control circuit 122. The shutter control circuit 122 includes a register control circuit 221, a timing control circuit 222, and an internal synchronization signal generation circuit 223, and generates a shutter scan start signal and a synchronization signal for the shutter scan. The register control circuit 221 holds settings concerning the shutter scan, such as a shutter scan start timing. The timing control circuit 222 generates a timing signal necessary for the shutter scan, such as a shutter scan start signal, a switch signal of the synchronization signal for the shutter scan. The internal synchronization signal generation circuit 223 switches the cycle of the synchronization signal for the shutter scan in accordance with the switch signal of the synchronization signal for the shutter scan. More specifically, synchronization signals 1 and 2 of two systems are input to the control circuit 102, as described above, and the horizontal synchronization signal hdi of synchronization signal 1 and the horizontal synchronization signal hdi_ex of synchronization signal 2 are supplied to the internal synchronization signal generation circuit 223 arranged in the shutter control circuit 122 of the control circuit 102. The internal synchronization signal generation circuit 223 switches the cycle of the synchronization signal for the shutter scan by selecting the synchronization signal for the shutter scan from the horizontal synchronization signals hdi and hdi_ex in accordance with the switch signal of the synchronization signal for the shutter scan.

In this case, no restriction is specifically imposed on the cycles of the synchronization signals of two systems input to the control circuit 102. That is, the relationship between the cycle of the horizontal synchronization signal hdi of synchronization signal 1 and the cycle of the horizontal synchronization signal hdi_ex of synchronization signal 2 may be a relationship of an integer multiple or an integral submultiple, or a relationship of a non-integer multiple or a non-integral submultiple.

As shown in FIG. 6, the scanning circuit 103 can include a readout scan control circuit 131 and a shutter scan control circuit 132. The readout scan control circuit 131 starts an operation upon receiving the readout scan start signal supplied from the timing control circuit 212 of the readout control circuit 121. The readout scan control circuit 131 generates a readout scan control signal for reading out signals by driving, on a row basis, the plurality of pixels P arranged in the pixel unit 104 every time the synchronization signal for the readout scan is supplied from the internal synchronization signal generation circuit 213 of the readout control circuit 121. The shutter scan control circuit 132 starts an operation upon receiving the shutter scan start signal supplied from the timing control circuit 222 of the shutter control circuit 122. The shutter scan control circuit 132 generates a shutter scan control signal for starting an accumulation operation after the reset of the pixels P by driving, on a row basis, the plurality of pixels P arranged in the pixel unit 104 every time the synchronization signal for the shutter scan is supplied from the internal synchronization signal generation circuit 223 of the shutter control circuit 122.

Figure 9:
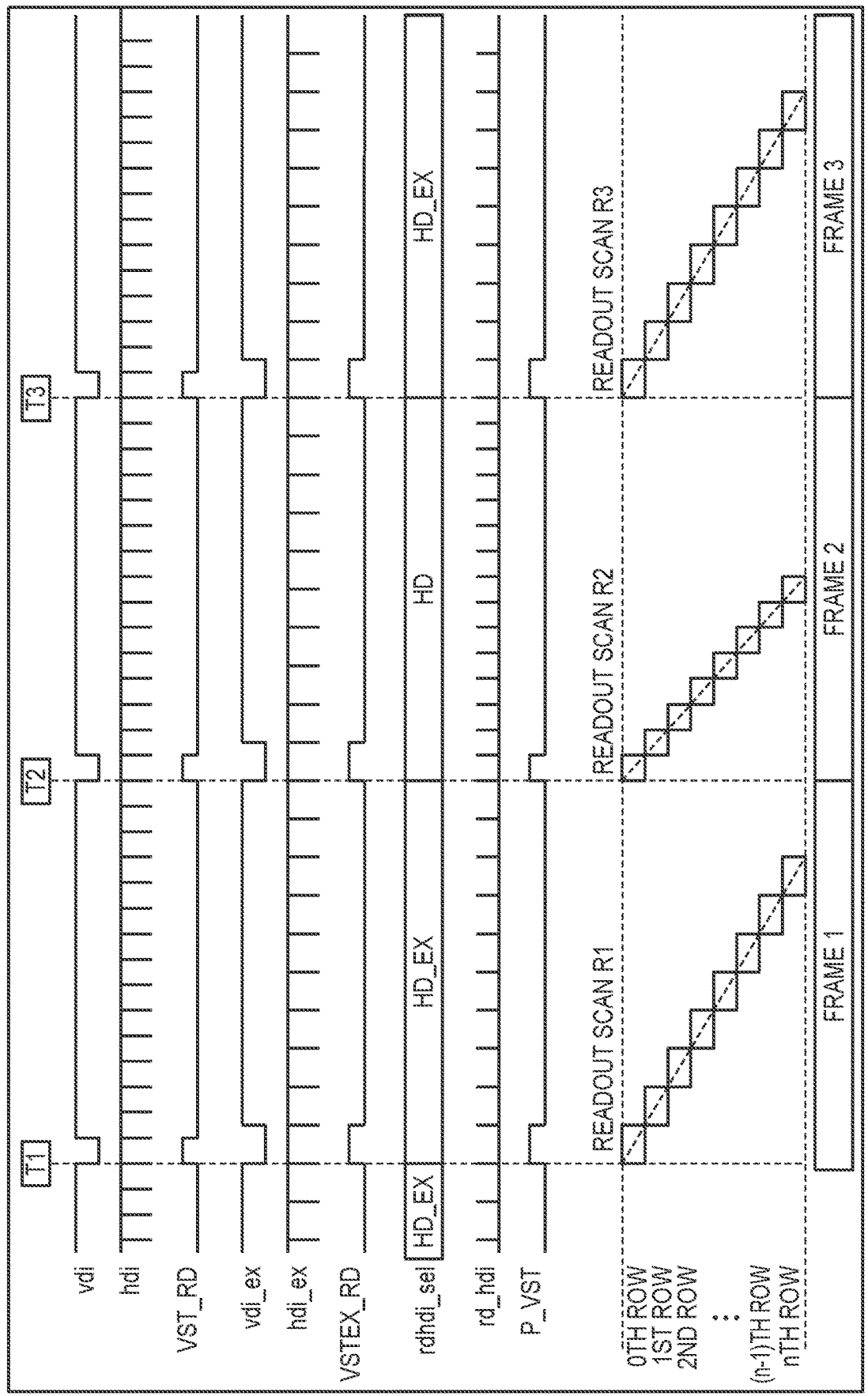
FIG. 9 is a timing chart showing an example of the operation of the readout control circuit shown in FIG. 7.

The operation of the readout control circuit 121 will be described with reference to a timing chart shown in FIG. 9. A description will be provided by assuming that synchronization signals 1 and 2 input to the control circuit 102 include vertical synchronization signals vdi and vdi_ex in addition to the above-described horizontal synchronization signals hdi and hdi_ex, respectively. The vertical synchronization signal vdi and the horizontal synchronization signal hdi are supplied as synchronization signal 1, and the vertical synchronization signal vdi_ex and the horizontal synchronization signal hdi_ex are supplied as synchronization signal 2.

The readout scan is started in synchronism with the vertical synchronization signal. In the timing chart shown in FIG. 9, a readout scan R1 is started at time T1, a readout scan R2 is started at time T2, and a readout scan R3 is started at time T3. FIG. 9 shows an example in which the readout scan is started only once for one frame.

The register control circuit 211 switches, in synchronism with the input of the vertical synchronization signal, the synchronization signal for the readout scan to be used for each frame, and generates a selection signal rdhdi_sel of the synchronization signal for the readout scan. The internal synchronization signal generation circuit 213 includes a circuit that selects one of the horizontal synchronization signals hdi and hdi_ex in accordance with the selection signal rdhdi_sel of the synchronization signal for the readout scan supplied from the register control circuit 211 and generates a synchronization signal rd_hdi for the readout scan. The timing control circuit 212 includes a pulse generation circuit that generates a timing control pulse VST_RD in accordance with the falling timing of the vertical synchronization signal vdi, and a pulse generation circuit that generates a timing control pulse VSTEX_RD in accordance with the vertical synchronization signal vdi_ex. Furthermore, the timing control circuit 212 includes a circuit that selects one of the timing control pulses VST_RD and VSTEX_Rd in accordance with the selection signal rdhdi_sel supplied from the register control circuit 211 and generates a readout scan start signal P_VST. At time T1, the vertical synchronization signal vdi_ex and the horizontal synchronization signal hdi_ex supplied as synchronization signal 2 to the control circuit 102 are selected in accordance with the selection signal rdhdi_sel, and the readout scan R1 operates in accordance with the cycle in which the horizontal synchronization signal hdi_ex is supplied. At time T2, the vertical synchronization signal vdi and the horizontal synchronization signal hdi supplied as synchronization signal 1 to the control circuit 102 are selected in accordance with the selection signal rdhdi_sel, and the readout scan R2 operates in accordance with the cycle in which the horizontal synchronization signal hdi is supplied. At time T3, the vertical synchronization signal vdi_ex and the horizontal synchronization signal hdi_ex are selected again in accordance with the selection signal rdhdi_sel, and the readout scan R3 operates in accordance with the cycle in which the horizontal synchronization signal hdi_ex is supplied.

Next, the relationship between the operation of the shutter control circuit 122 and the shutter scan and readout scan will be described next with reference to a timing chart shown in FIGS. 10A and 10B. In the timing chart shown in FIGS. 10A and 10B, a readout scan R11 is a readout scan based on synchronization signal 1, and readout scans R10, R12, and R13 are readout scans based on synchronization signal 2. Furthermore, a shutter scan S11 corresponds to the readout scan R11, a shutter scan S12 corresponds to the readout scan R12, and a shutter scan S13 corresponds to the readout scan R13.

In the shutter scan, a scan is started the accumulation time before the corresponding readout scan. In the timing chart shown in FIGS. 10A and 10B, the shutter scan S11 is started at TS1, and the readout scan R11 corresponding to the shutter scan S11 is started at time TR1. An accumulation time T(P) is given by T(P)=TR1−TS1. Similarly, in the shutter scan S12, a scan is started at time TS2, and in the corresponding readout scan R12, a scan is started at time TR2. An accumulation time T(M) is given by T(M)=TR2−TS2. The accumulation time can be controlled individually for each readout scan. On the other hand, in one readout scan, it is necessary to make the accumulation time constant for all the rows. For example, in the readout scan R11, the accumulation time for all the rows from the 0th row to the nth row needs to be T(P).

The shutter control circuit 122 shown in FIG. 8 controls the shutter scan to operate in accordance with the same horizontal synchronization signal as that for the corresponding readout scan. By operating the corresponding shutter scan and readout scan in accordance with the synchronization signals of the same cycle, it is possible to keep the accumulation time constant for all the rows even in switching in the cycle of the arbitrary horizontal synchronization signal, and to switch a mode without generating a discarded frame. The discarded frame is a frame in which the length of the accumulation time is different between a pixel row group having undergone a scan (at least one of the shutter scan and the readout scan) first and a pixel row group having undergone a scan later among the pixel rows from the 0th row to the nth row of one frame. Such frame can be a frame that is not used for an image since the luminance difference between the pixel row group having undergone the scan first and the pixel row group having undergone the scan later is larger than the luminance difference of the original object.

The register control circuit 221 holds, in each frame, setting values of a shutter scan start setting sh_pos for synchronization signal 1 (horizontal synchronization signal hdi and vertical synchronization signal vdi) and a shutter scan start setting sh_pos_ex for synchronization signal 2 (horizontal synchronization signal hdi_ex and vertical synchronization signal vdi_ex). Since the accumulation time is set individually for each readout scan, the shutter scan start timing is updated in synchronism with the vertical synchronization signal. Furthermore, since the readout scan is performed once for one frame, only one of the shutter scan start setting sh_pos and the shutter scan start setting sh_pos_ex need only be set as an effective value.

The timing control circuit 222 of the control circuit 102 can further include counters that count the number of horizontal synchronization signals hdi and the number of horizontal synchronization signals hdi_ex supplied after the start of the readout scan, respectively. Each counter is reset to 0 when the vertical synchronization signal is input, and counts up a value by one every time the horizontal synchronization signal is input. The counter corresponding to the vertical synchronization signal vdi and the horizontal synchronization signal hdi of synchronization signal 1 outputs a count value hdcnt, and the counter corresponding to the vertical synchronization signal vdi_ex and the horizontal synchronization signal hdi_ex of synchronization signal 2 outputs a count value hdcnt_ex.

Figure 10A:
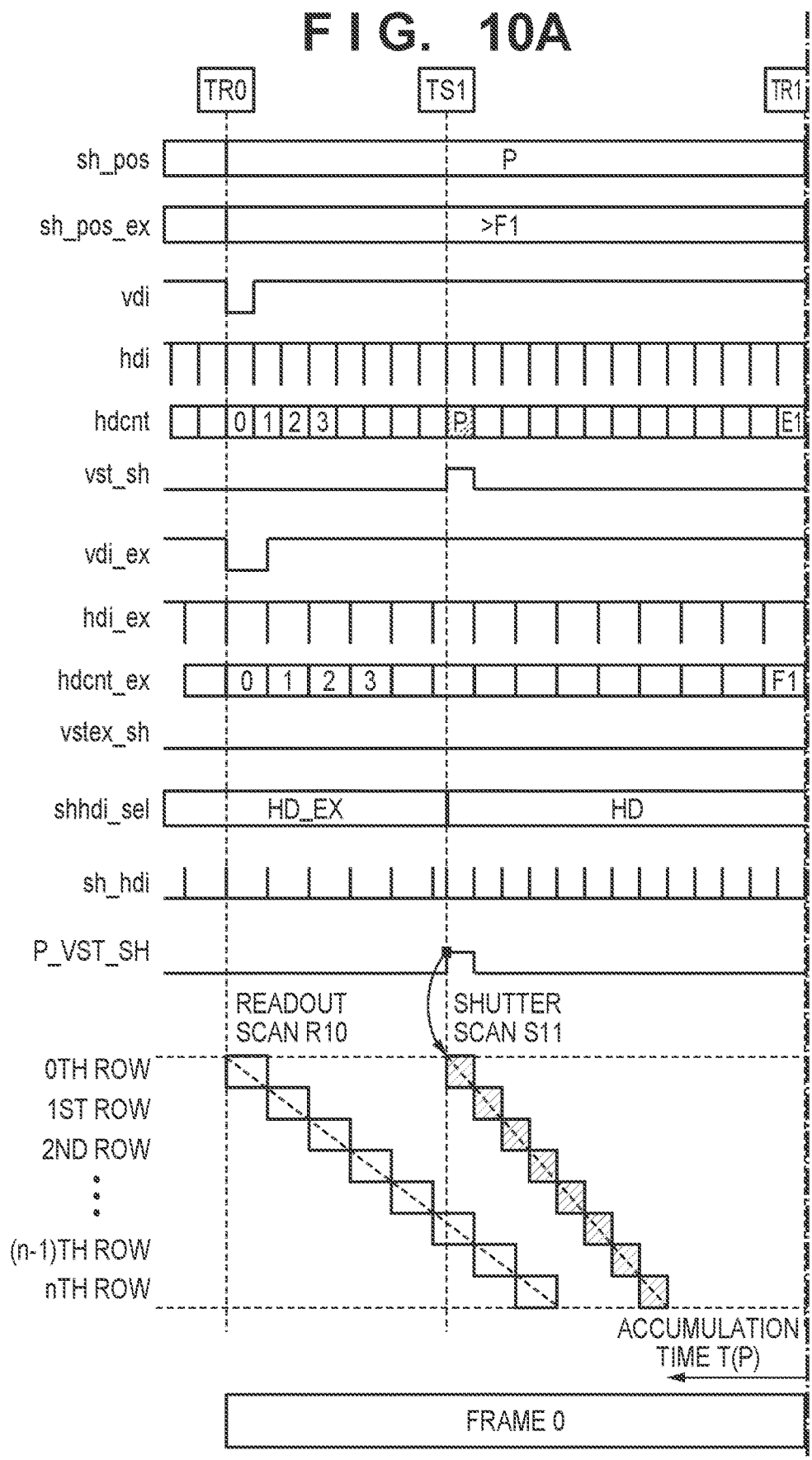
FIGS. 10A and 10B is a timing chart showing an example of the operation of the shutter control circuit shown in FIG. 8.
Figure 10B:
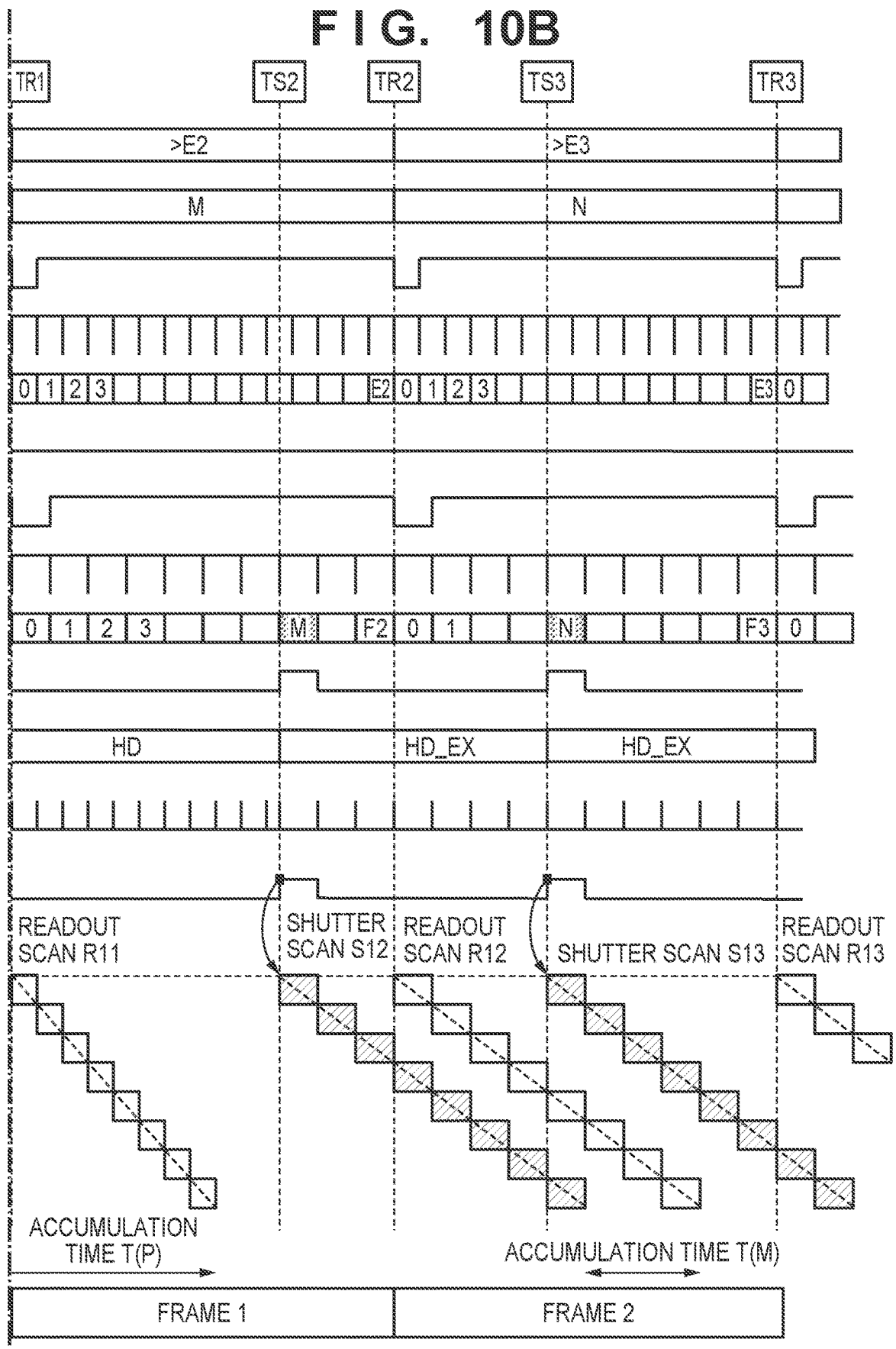

In the example shown in FIGS. 10A and 10B, the counter counts up the count value hdcnt up to E1 for frame 0, up to E2 for frame 1, and up to E3 for frame 2. Furthermore, the counter counts up the count value hdcnt_ex up to F1 for frame 0, up to F2 for frame 1, and up to F3 for frame 2. In the arrangement shown in FIG. 8, the counter for obtaining the count value hdcnt and the counter for obtaining the count value hdcnt_ex are individually arranged. However, the present invention is not limited to this. As long as the count values hdcnt and hdcnt_ex are obtained, for example, one counter circuit may be arranged.

A signal VST_SH is set at high level when the count value hdcnt becomes equal to the value of the shutter scan start setting sh_pos. A signal VSTEX_SH is set at high level when the count value hdcnt_ex becomes equal to the value of the shutter scan start setting sh_pos_ex.

If the signal VST_SH is set at high level, the shutter scan is started in accordance with synchronization signal 1, and a selection signal shhdi_sel outputs a logic level of selecting the vertical synchronization signal vdi and the horizontal synchronization signal hdi. If the signal VSTEX_SH is set at high level, the shutter scan is started in accordance with synchronization signal 2, and the selection signal shhdi_sel outputs a logic level of selecting the vertical synchronization signal vdi_ex and the horizontal synchronization signal hdi_ex.

In the example shown in FIGS. 10A and 10B, in frame 0, the shutter scan start setting sh_pos=P and the shutter scan start setting sh_pos_ex>F1 are set. At time TS1, the count value hdcnt=P of the counter corresponding to synchronization signal 1 is set, the signal VST_SH is set at high level, and the selection signal shhdi_sel for the shutter scan is set at a logic level of selecting the horizontal synchronization signal hdi and the vertical synchronization signal vdi. On the other hand, in this case, with respect to the counter value hdcnt_ex of the counter corresponding to synchronization signal 2, there is no timing of setting hdcnt_ex=sh_pos_ex, and thus the signal VSTEX_SH is not set at high level in frame 0.

In frame 1, the shutter scan start setting sh_pos>E2 and the shutter scan start setting sh_pos_ex=M are set. At time TS2, the count value hdcnt_ex=M of the counter corresponding to synchronization signal 2 is set, the signal VSTEX_SH is set at high level, and the selection signal shhdi_sel is set at a logic level of selecting the horizontal synchronization signal hdi_ex and the vertical synchronization signal vdi_ex. On the other hand, in frame 1, with respect to the counter value hdcnt of the counter corresponding to synchronization signal 1, there is no timing of setting hdcnt=sh_pos, and thus the signal VST_SH is not set at high level.

In frame 2, the shutter scan start setting sh_pos>E3 and the shutter scan start setting sh_pos_ex=N are set. At time TS3, the count value hdcnt_ex=N of the counter corresponding to synchronization signal 2 is set, the signal VSTEX_SH is set at high level, and the selection signal shhdi_sel is set at a logic level of selecting the horizontal synchronization signal hdi_ex and the vertical synchronization signal vdi_ex. On the other hand, in frame 2, with respect to the counter value hdcnt of the counter corresponding to synchronization signal 1, there is no timing of setting hdcnt=sh_pos, and thus the signal VST_SH is not set at high level.

A shutter scan start signal P_VST_SH outputs high level when one of the signals VST_SH and VSTEX_SH is set at high level, thereby starting the shutter scan. At time TS1, the shutter scan start signal P_VST_SH is set at high level and the shutter scan S11 is started. However, synchronization signal 1 is selected by the selection signal shhdi_sel, and the shutter scan can be performed in accordance with the cycle in which the same horizontal synchronization signal hdi as that for the readout scan R11 is supplied.

Similarly, at time TS2, the shutter scan start signal P_VST_SH is set at high level and the shutter scan S12 is started. However, synchronization signal 2 is selected by the selection signal shhdi_sel, and the shutter scan can be performed in accordance with the same horizontal synchronization signal hdi_ex as that for the readout scan R12.

As described above, the control circuit 102 switches between the driving operations that are different in length of the readout period of signals from one row in the readout scan. For example, the driving operation includes a readout scan based on the horizontal synchronization signal hdi and a driving operation based on the horizontal synchronization signal hdi_ex for which the length of the readout period of signals is long, as compared with the horizontal synchronization signal hdi. In this case, when switching the driving operation, the control circuit 102 switches, in accordance with the start of the shutter scan in the driving operation after switching, the cycle in which the synchronization signal for the shutter scan is supplied. In this case, the shutter control circuit 122 of the control circuit 102 supplies the synchronization signal for the shutter scan to the scanning circuit 103 in the first cycle in the driving operation based on the horizontal synchronization signal hdi, and supplies the synchronization signal for the shutter scan to the scanning circuit 103 in the second cycle different from the first cycle in the driving operation based on the horizontal synchronization signal hdi_ex. As described above, the control circuit 102 is supplied with the horizontal synchronization signal hdi as synchronization signal 1 and the horizontal synchronization signal hdi_ex as synchronization signal 2. By switching between the horizontal synchronization signals hdi and hdi_ex, it is possible to switch the cycle of the synchronization signal for the shutter scan, thereby implementing the above-described operation. Thus, the scanning circuit 103 need not include a divider circuit or a multiplier circuit for generating a plurality of kinds of synchronization signals for the shutter scan. Therefore, it is possible to suppress an increase in the circuit arrangement of the scanning circuit 103.

Furthermore, by switching between the horizontal synchronization signals hdi and hdi_ex, the cycle of the synchronization signal for the shutter scan is switched by the driving operation. In this case, when switching the cycle of the synchronization signal for the shutter scan, the cycle can be set to an arbitrary cycle by arbitrarily setting the cycles of synchronization signals 1 and 2. That is, as described in Japanese Patent Laid-Open No. 2021-034963, it is not necessary to scan the plurality of pixels P arranged in the pixel unit 104 on a row basis in a cycle that is n times (n is an integer of 1 or more) the cycle of the horizontal synchronization signal input to the control circuit 102, and it is possible to perform the shutter scan and the readout scan in an arbitrary cycle. That is, in the two driving operations that are different in length of the readout period of signals in the readout scan, the relationship between the cycles of the synchronization signals for the shutter scan supplied from the control circuit 102 to the scanning circuit 103 may be a relationship of a non-integer multiple or a non-integral submultiple. In other words, in a case where the two driving operations that are different in length of the readout period of signals in the readout scan are set as the first driving operation and the second driving operation, the relationship between the cycle of the synchronization signal for the shutter scan supplied from the control circuit 102 to the scanning circuit 103 in the first driving operation and the cycle of the synchronization signal for the shutter scan supplied from the control circuit 102 to the scanning circuit 103 in the second driving operation may be a relationship of a non-integer multiple or a non-integral submultiple. Since the relationship between the cycles of the synchronization signals for the shutter scan can freely be selected, it is possible to set the cycle of the synchronization signal to an optimum (shortest) cycle in each driving operation, thereby increasing the speed of driving. Furthermore, by optimizing the cycle of the synchronization signal, for example, the operation time of the analog circuit arranged in the column circuit 105 is shortened, thereby suppressing the power consumption in the photoelectric conversion device 100. Thus, it is possible to improve the usability of the photoelectric conversion device 100. For example, the use time is increased in a case where a rechargeable battery of the same capacity is used.

The corresponding shutter scan and readout scan can be controlled using the same horizontal synchronization signals hdi and hdi_ex, as described above. Thus, it is easy to control the control circuit 102, the scanning circuit 103, and the like. Therefore, in the two driving operations that are different in length of the readout period of signals in the readout scan, the relationship between the cycles of the synchronization signal for the shutter scan and the synchronization signal for the readout scan supplied from the control circuit 102 to the scanning circuit 103 may be a relationship of a non-integer multiple or a non-integral submultiple. As described above, in a case where the two driving operations that are different in length of the readout period of signals in the readout scan are set as the first driving operation and the second driving operation, the relationship between the cycle of the synchronization signal for the shutter scan and the synchronization signal for the readout scan supplied from the control circuit 102 to the scanning circuit 103 in the first driving operation and the cycle of the synchronization signal for the shutter scan and the synchronization signal for the readout scan supplied from the control circuit 102 to the scanning circuit 103 in the second driving operation may be a relationship of a non-integer multiple or a non-integral submultiple.

Furthermore, as described above, when switching the driving operation, the readout control circuit 121 of the control circuit 102 switches, in accordance with the start of the readout scan in the driving operation after switching, the cycle in which the synchronization signal for the readout scan is supplied. Therefore, as shown in FIGS. 10A and 10B, when switching the driving operation, before the readout scan by the driving operation before switching ends, the scanning circuit 103 can start the shutter scan by the driving operation after switching (for example, the relationship between the readout scan R10 and the shutter scan S11). In addition, even in a case where the driving operation is not switched, before the readout scan by one driving operation ends, the scanning circuit 103 can start the shutter scan by the next driving operation (for example, the relationship between the readout scan R12 and the shutter scan S13), as shown in FIGS. 10A and 10B.

This embodiment has explained, as the operations that are different in length of the readout period of signals from one row in the readout scan, an example in which the readout time (the number of times of readout) of signal charges from the pixels P. However, the present invention is not limited to this. For example, even in a case where the time of A/D conversion in the column circuit 105 is different, this embodiment can be applied. That is, the above description is provided by focusing on the scanning circuit 103 (vertical scanning circuit) but this embodiment is applicable to an operation of driving the pixels P arranged in the pixel unit 104 using the scanning circuits 103 and 106, which includes the operation of the scanning circuit 106 (horizontal scanning circuit).

Furthermore, as described above, synchronization signals 1 and 2 of two systems are supplied to the control circuit 102. Synchronization signals 1 and 2 may be supplied from the outside of the photoelectric conversion device 100 or the photoelectric conversion device 100 may include circuits for generating synchronization signals 1 and 2. For example, the photoelectric conversion device 100 may further include a first generation circuit that generates synchronization signal 1 (horizontal synchronization signal hdi), and a second generation circuit that generates synchronization signal 2 (horizontal synchronization signal hdi_ex). In this case, the first generation circuit and the second generation circuit may individually generate synchronization signals 1 and 2. That is, it is not necessary to arrange a divider circuit or a multiplier circuit between the first generation circuit and the second generation circuit. For example, the first generation circuit and the second generation circuit may be formed by appropriate oscillation circuits such as voltage-controlled oscillators (VCOs) that are supplied with different voltages.

Figure 11:
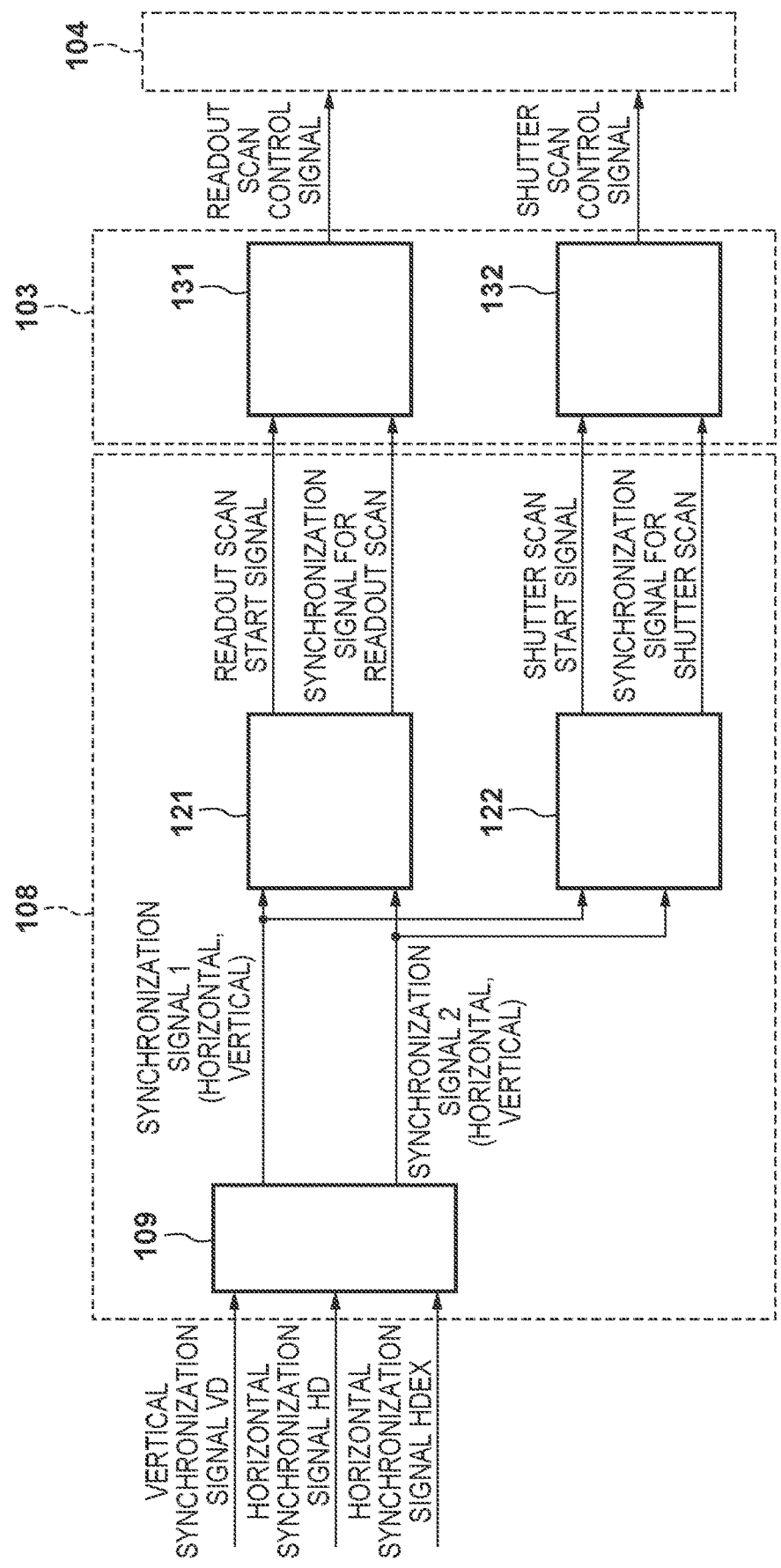
FIG. 11 is a block diagram showing an example of the arrangement of a control circuit and a scanning circuit of the photoelectric conversion device shown in FIG. 1.

FIG. 11 is a block diagram showing a modification of the example of the arrangement of the control circuit 102 and the scanning circuit 103 of the photoelectric conversion device 100 shown in FIG. 6. The control circuit 102 shown in FIG. 6 is changed to a control circuit 108. An input circuit 109 is added to the control circuit 108, as compared with the control circuit 102. A vertical synchronization signal VD of one system and horizontal synchronization signals HD and HDEX of two systems are input to the input circuit 109, thereby generating synchronization signals 1 and 2 of two systems. The remaining components may be the same as those described above, and thus a description thereof will be omitted as appropriate and the difference will mainly be described.

When inputting a plurality of synchronization signals to the photoelectric conversion device 100, it is difficult to input the signals at completely the same timing, and a time difference may occur between the synchronization signals. The time difference between the synchronization signals will be described with reference to a timing chart shown in FIG. 12.

Figure 12:
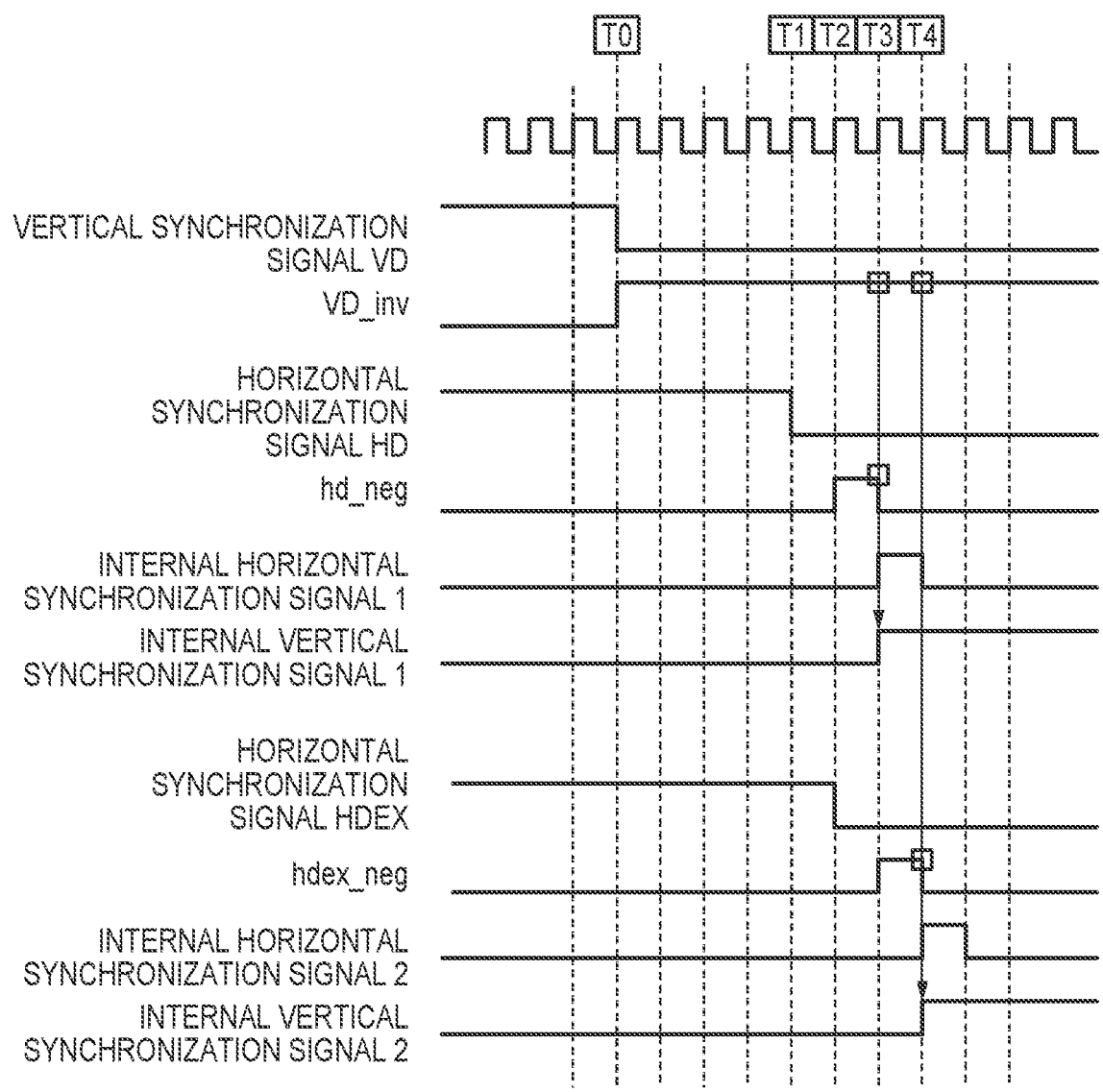
FIG. 12 is a timing chart showing an example of the operation of the photoelectric conversion device shown in FIG. 1 according to a comparative example.
Figure 13:
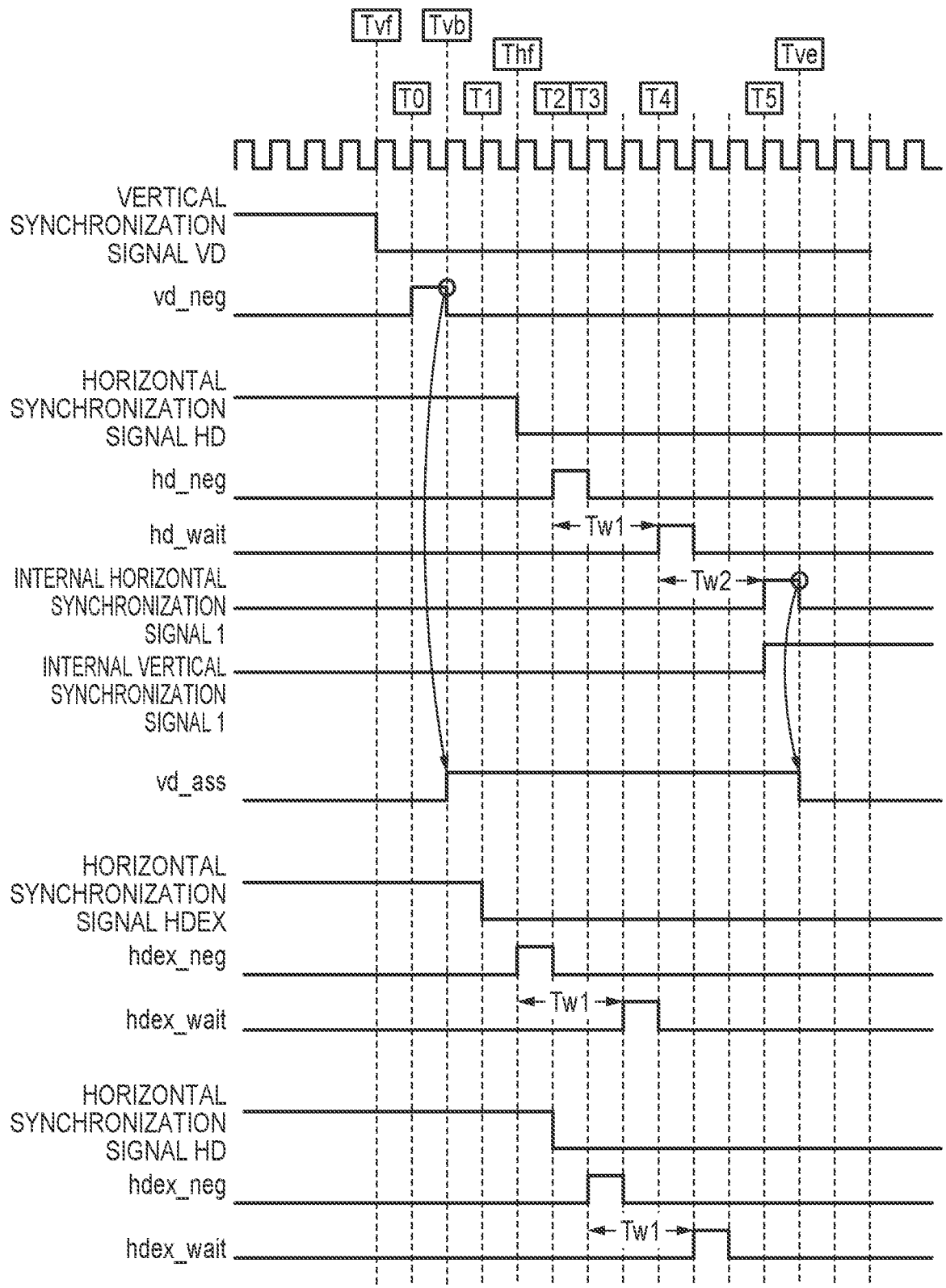
FIG. 13 is a timing chart showing an example of the operation of the photoelectric conversion device shown in FIG. 11.

In the timing chart shown in FIG. 12, internal horizontal synchronization signal 1 and internal vertical synchronization signal 1 indicate synchronization signal 1 output from the input circuit 109 shown in FIG. 11. Similarly, in the timing chart shown in FIG. 12, internal horizontal synchronization signal 2 and internal vertical synchronization signal 2 indicate synchronization signal 2 output from the input circuit 109 shown in FIG. 11.

At time T0, the vertical synchronization signal VD falls. An internal signal VD_inv is a signal obtained by inverting the vertical synchronization signal VD. Next, the horizontal synchronization signal HD falls at time T1, and the horizontal synchronization signal HDEX falls at time T2. At time T2, the fall of the horizontal synchronization signal HD is detected, and a signal hd_neg is set at high level. At time T3 when the signal VD_inv is at high level and the signal hd_neg is at high level, internal vertical synchronization signal 1 is generated. At time T3, internal horizontal synchronization signal 1 is simultaneously generated. A description will be provided by assuming that internal vertical synchronization signals 1 and 2 are generated in synchronism with the rising edges of internal horizontal synchronization signals 1 and 2, respectively. However, the present invention is not limited to this, and internal vertical synchronization signals 1 and 2 may be generated in synchronism with the falling edges of internal horizontal synchronization signals 1 and 2, respectively.

On the other hand, the horizontal synchronization signal HDEX falls at time T2, and operates at the same timing as that in the case of the horizontal synchronization signal HD. At time T4, interval horizontal synchronization signal 2 and internal vertical synchronization signal 2 are generated. Therefore, the vertical synchronization timing indicated by interval horizontal synchronization signal 1 and internal vertical synchronization signal 1 is time T3, and the vertical synchronization timing indicated by interval horizontal synchronization signal 2 and internal vertical synchronization signal 2 is time T4, which do not match each other.

To cope with this, even in a case where synchronization signals of two systems are input, the input circuit 109 performs the following control to make the timings of the vertical synchronization signals match each other. The operation of the input circuit 109 will be described with reference to a timing chart shown in FIG. 13.

The vertical synchronization signal VD falls at time Tvf, and the signal vd_neg indicating the fall of the vertical synchronization signal VD is set at high level at time T0. When the signal vd_neg is set at high level, a signal vd_ass is set at high level at time Tvb, thereby setting a state of waiting for generation of an internal vertical synchronization signal.

The horizontal synchronization signal HD falls at time Thf, and the signal hd_neg indicating the fall of the horizontal synchronization signal HD is set at high level at time T2. After the signal hd_neg is set at high level, a signal hd wait is set at high level at time T4 when a time Tw1 elapses. After the signal hd wait is set at high level, internal horizontal synchronization signal 1 (horizontal synchronization signal hdi) and internal vertical synchronization signal 1 (vertical synchronization signal vdi) are generated at time T5 when a time Tw2 elapses. After internal horizontal synchronization signal 1 (horizontal synchronization signal hdi) and internal vertical synchronization signal 1 (vertical synchronization signal vdi) are generated, the signal vd_ass is set at low level at time Tve, thereby returning to a state in which the generation of the internal vertical synchronization signal ends.

The horizontal synchronization signal HDEX may fall about one cycle before or after the falling timing of the horizontal synchronization signal HD. To cope with this, the input circuit 109 generates internal vertical synchronization signal 2 (vertical synchronization signal vdi_ex) using the horizontal synchronization signal HD without using the horizontal synchronization signal HDEX during a period in which the signal vd_ass is at high level. More specifically, if the signal vd_ass is at high level when a signal hdex wait is set at high level, internal vertical synchronization signal 2 (vertical synchronization signal vdi_ex) is generated with reference to the signal hd wait generated from the horizontal synchronization signal HD. This can make the timings of internal vertical synchronization signals 1 and 2 match each other even in a case where the input timings of the horizontal synchronization signals HD and HDEX do not completely match each other.

Internal vertical synchronization signals 1 and 2 (vertical synchronization signals vdi and vdi_ex) are signals for generating the shutter scan start signal P_VST_SH and the readout scan start signal P_VST, as described above. That is, the vertical synchronization signal VD indicating the timing of the driving operation is supplied to the input circuit 109 of the control circuit 108. The input circuit 109 of the control circuit 108 generates internal vertical synchronization signals 1 and 2 (vertical synchronization signals vdi and vdi_ex) as signals indicating the timing of starting at least one of the shutter scan and the readout scan from the vertical synchronization signal VD using one of the horizontal synchronization signals HD and HDEX. Thus, even in a case where the cycles of the horizontal synchronization signals HD and HDEX supplied to the control circuit 108 do not match, the control circuit 108 can supply internal vertical synchronization signals 1 and 2 (vertical synchronization signals vdi and vdi_ex) to the scanning circuit 103 at appropriate timings.

Figure 14:
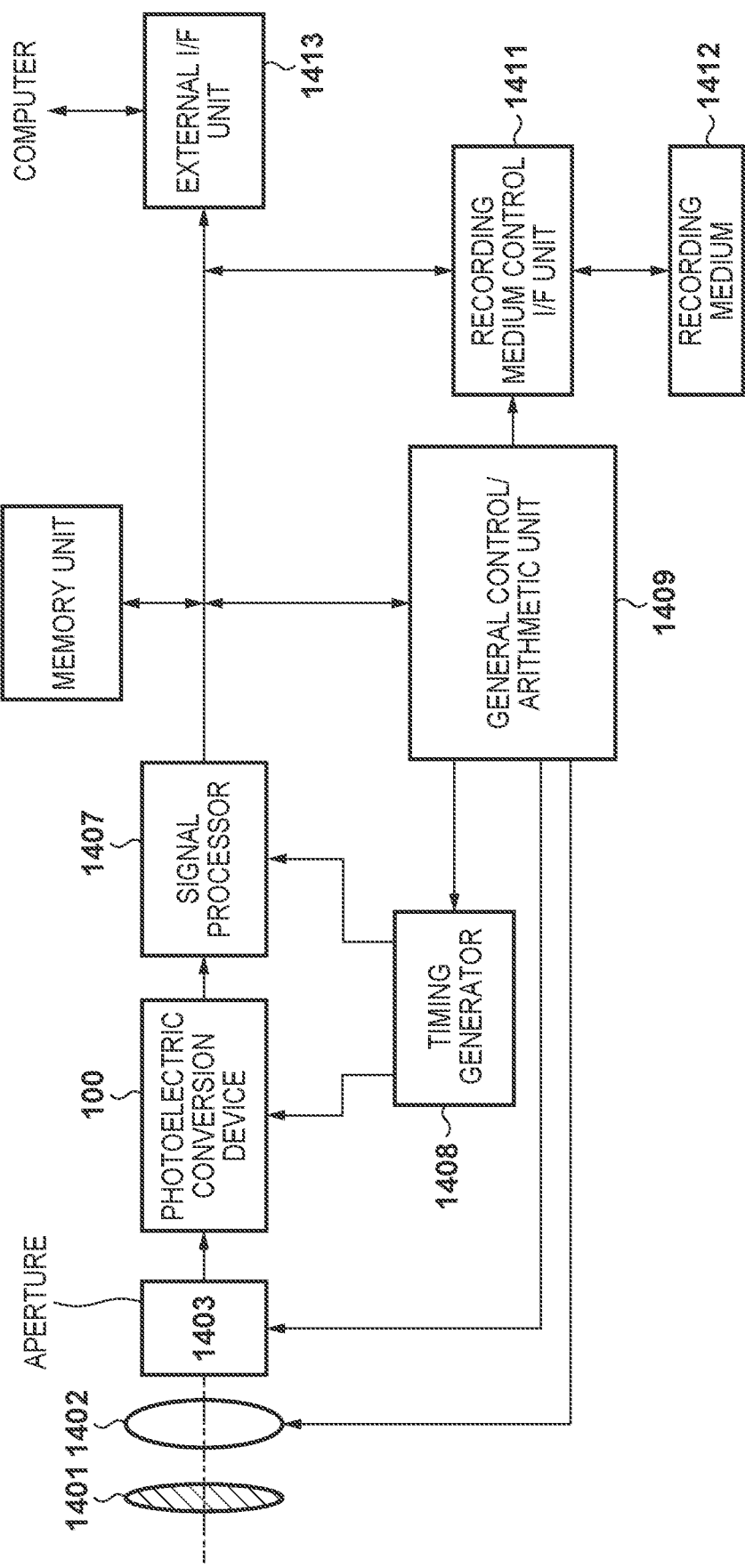
FIG. 14 is a block diagram showing an example of the configuration of a photoelectric conversion system incorporating the photoelectric conversion device shown in FIG. 1.

An application example of the photoelectric conversion device 100 according to this embodiment will now be described. FIG. 14 is a block diagram showing the schematic configuration of a photoelectric conversion system 1400 incorporating the photoelectric conversion device 100.

The above-described photoelectric conversion device 100 of this embodiment can be applied to various kinds of photoelectric conversion systems. Examples of photoelectric conversion systems to which the photoelectric conversion device is applicable are a digital still camera, a digital camcorder, a monitoring camera, a copying machine, a facsimile apparatus, a mobile phone, an in-vehicle camera, and an observation satellite. A camera module including an optical system such as a lens and a photoelectric conversion device is also included in the photoelectric conversion systems. FIG. 14 shows the block diagram of a digital still camera as an example of these.

The photoelectric conversion system 1400 shown in FIG. 14 includes the photoelectric conversion device 100, a lens 1402 that forms an optical image of an object on the pixel unit 104 of the photoelectric conversion device 100, an aperture 1403 configured to change the amount of light passing through the lens 1402, and a barrier 1401 configured to protect the lens 1402. The lens 1402 and the aperture 1403 form an optical system that condenses light to the photoelectric conversion device 100. The photoelectric conversion device 100 converts the optical image formed by the lens 1402 into an electrical signal.

The photoelectric conversion system 1400 also includes a signal processor 1407 that is an image generator configured to generate an image by processing an output signal output from the photoelectric conversion device 100. The signal processor 1407 performs an operation of performing various kinds of correction and compression as needed, thereby outputting image data. The signal processor 1407 may be formed on a semiconductor substrate on which the photoelectric conversion device 100 is provided or may be formed on a semiconductor substrate different from the photoelectric conversion device 100. In addition, the photoelectric conversion device 100 and the signal processor 1407 may be formed on the same semiconductor substrate.

The photoelectric conversion system 1400 further includes a memory unit 1410 configured to temporarily store image data, and an external interface unit (external OF unit) 1413 configured to communicate with an external computer or the like. Furthermore, the photoelectric conversion system 1400 includes a recording medium 1412 such as a semiconductor memory configured to record or read out image capturing data, and a recording medium control interface unit (recording medium control OF unit) 1411 configured to perform record or readout for the recording medium 1412. Note that the recording medium 1412 may be incorporated in the photoelectric conversion system 1400 or may be detachable.

Furthermore, the photoelectric conversion system 1400 includes a general control/arithmetic unit 1409 that controls various kinds of operations and the entire digital still camera, and a timing generator 1408 that outputs various kinds of timing signals to the photoelectric conversion device 100 and the signal processor 1407. In this example, the timing signal and the like may be input from the outside, and the photoelectric conversion system 1400 need only include at least the photoelectric conversion device 100, and the signal processor 1407 that processes an output signal output from the photoelectric conversion device 100.

The photoelectric conversion device 100 outputs an image capturing signal to the signal processor 1407. The signal processor 1407 executes predetermined signal processing for the signal output from the photoelectric conversion device 100, and outputs image data. In other words, the signal processor 1407 generates an image using the signal output from the photoelectric conversion device 100.

As described above, according to this embodiment, it is possible to implement the photoelectric conversion system to which the above-described photoelectric conversion device 100 (to be also called, for example, an image capturing device) is applied.

Figure 15A:
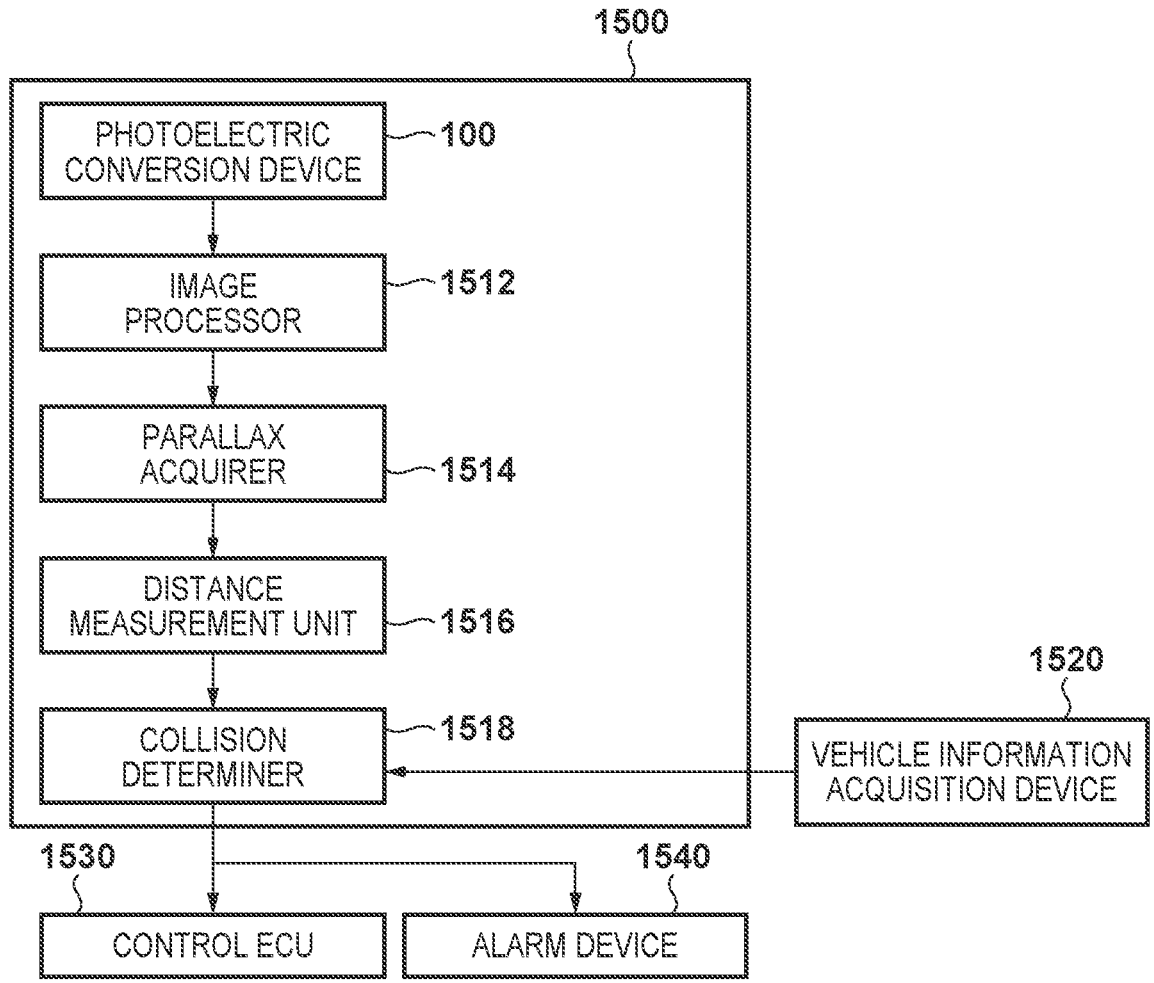
FIGS. 15A and 15B are a block diagram and a view showing an example of the arrangement of a moving body incorporating the photoelectric conversion device shown in FIG. 1.
Figure 15B:
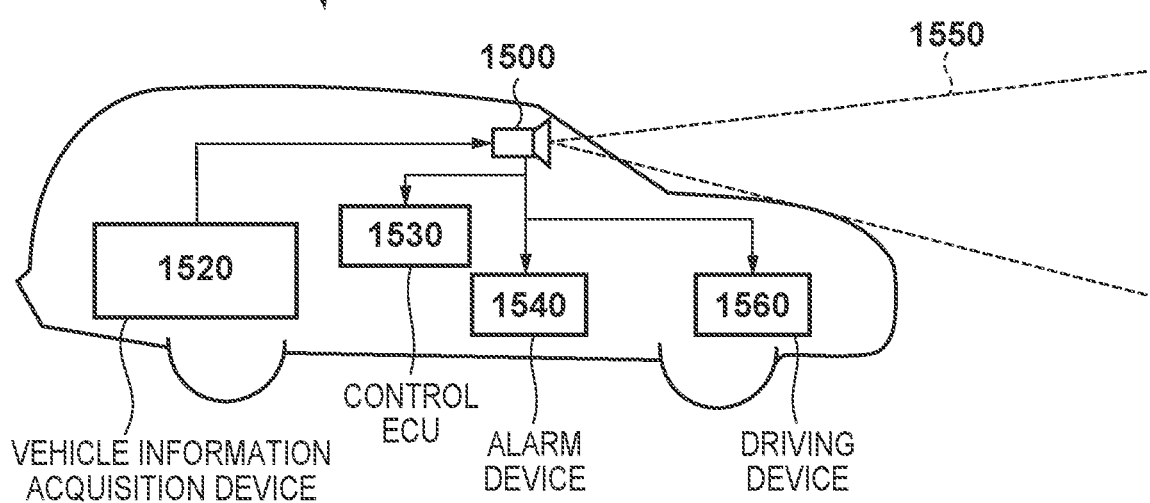

A photoelectric conversion system incorporating the photoelectric conversion device 100 of this embodiment and a moving body will be described next with reference to FIGS. 15A and 15B. FIGS. 15A and 15B are a block diagram and a view showing the configuration of a photoelectric conversion system 1500 incorporating the photoelectric conversion device 100 according to this embodiment and the arrangement of a transport apparatus 1501 as a moving body incorporating the photoelectric conversion system 1500.

FIG. 15A shows an example of the photoelectric conversion system 1500 concerning an in-vehicle camera. The photoelectric conversion system 1500 includes an image processor 1512 that performs signal processing such as image processing for a plurality of image data acquired by the photoelectric conversion device 100 of this embodiment, and a parallax acquirer 1514 that calculates a parallax (the phase difference between parallax images) from the plurality of image data that have undergone the signal processing by the image processor 1512. The photoelectric conversion system 1500 also includes a distance acquirer 1516 that calculates the distance up to a target based on the calculated parallax, and a collision determiner 1518 that determines, based on the calculated distance, whether there is collision possibility. Here, the parallax acquirer 1514 and the distance acquirer 1516 are examples of a distance information acquirer that acquires distance information up to a target. That is, the distance information is information concerning a parallax, a defocus amount, a distance up to a target, and the like. The collision determiner 1518 may determine collision possibility using one of the pieces of distance information. The distance information acquirer may be implemented by exclusively designed hardware, or may be implemented by a software module. The distance information acquirer may be implemented by a Field Programmable Gate Array (FPGA) or Application Specific Integrated Circuit (ASIC), or may be implemented by a combination of these.

The photoelectric conversion system 1500 is connected to a vehicle information acquisition device 1520 of the transport apparatus 1501 (for example, a vehicle) including a driving device, and can acquire vehicle information such as a vehicle speed, a yaw rate, and a steering angle. The photoelectric conversion system 1500 is also connected to a control ECU 1530 that is a control device configured to output a control signal for generating a braking force to the vehicle based on the determination result of the collision determiner 1518. Furthermore, the photoelectric conversion system 1500 is connected to an alarm device 1540 that generates an alarm to the driver based on the determination result of the collision determiner 1518. For example, if collision possibility is high as the determination result of the collision determiner 1518, the control ECU 1530 performs vehicle control of braking, releasing the accelerator pedal, or suppressing the engine output, thereby avoiding collision and reducing damage. The alarm device 1540 sounds an alarm, displays alarming information on the screen of a car navigation system or the like, or applies a vibration to the seat belt or a steering wheel, thereby making an alarm to the user.

In this embodiment, the periphery of the transport apparatus 1501, for example, the front or rear side is captured by the photoelectric conversion system 1500. FIG. 15B shows the photoelectric conversion system 1500 in a case where the front side (image capturing range 1550) of the transport apparatus 1501 is captured. The vehicle information acquisition device 1520 sends an instruction to the photoelectric conversion system 1500 or the photoelectric conversion device 100. With this configuration, it is possible to further improve the accuracy of distance measurement.

An example in which a driving device 1560 such as the brake, the accelerator, and the engine of the transport apparatus 1501 is controlled based on information obtained by the photoelectric conversion device 100 so as not to collide with another vehicle has been described. However, the present invention is not limited to this, and the system can also be applied to control of performing automated driving following another vehicle or control of performing automated driving without deviating from a lane. Furthermore, an example in which the photoelectric conversion system 1500 incorporating the photoelectric conversion device 100 is incorporated in the transport apparatus 1501 has been described. However, the photoelectric conversion device 100 may be incorporated in the vehicle information acquisition device 1520, the control ECU 1530, or the alarm device 1540. The photoelectric conversion system 1500 incorporating the photoelectric conversion device 100 can be applied not only to a vehicle such as an automobile but also to, for example, a transport apparatus including a driving device, such as a ship, an airplane, a railroad vehicle, or an industrial robot. In addition, the photoelectric conversion system can be applied not only to a moving body but also to an apparatus that broadly uses object recognition, such as an intelligent transport system (ITS).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-177363, filed Nov. 4, 2022, which is hereby incorporated by reference herein in its entirety.

What is claimed is:

1. A photoelectric conversion device comprising a plurality of pixels arranged to form a plurality of rows, a scanning circuit configured to drive the plurality of pixels, and a control circuit, wherein the scanning circuit is configured to perform a driving operation including a first scan of causing the plurality of pixels to start an accumulation operation on a row basis and a second scan of reading out signals from the plurality of pixels on a row basis after the first scan, the driving operation includes a first driving operation and a second driving operation that are different in a length of a readout period of signals from one row in the second scan, the control circuit is configured to supply, to the scanning circuit, a first synchronization signal for controlling the first scan and a second synchronization signal for controlling the second scan, and a relationship between a cycle of the first synchronization signal and the second synchronization signal supplied from the control circuit to the scanning circuit in the first driving operation and a cycle of the first synchronization signal and the second synchronization signal supplied from the control circuit to the scanning circuit in the second driving operation is a relationship of a non-integer multiple or a non-integral submultiple.

2. The device according to claim 1, wherein at the time of switching the driving operation from the first driving operation to the second driving operation, the control circuit is configured to switch, in accordance with a start of the first scan in the second driving operation, a cycle in which the first synchronization signal is supplied.

3. The device according to claim 1, wherein the scanning circuit is configured to drive the plurality of pixels on a row basis every time the first synchronization signal is supplied from the control circuit in the first scan.

4. The device according to claim 1, wherein
the scanning circuit is configured to drive the plurality of pixels on a row basis every time the control circuit supplies the second synchronization signal in the second scan, and
at the time of switching the driving operation from the first driving operation to the second driving operation, the control circuit is configured to switch, in accordance with a start of the second scan in the second driving operation, a cycle in which the second synchronization signal is supplied.

5. The device according to claim 1, wherein
the control circuit is configured to supply the first synchronization signal to the scanning circuit in a first cycle in the first driving operation, and to supply the first synchronization signal to the scanning circuit in a second cycle different from the first cycle in the second driving operation, and
each of a first horizontal synchronization signal corresponding to the first cycle and a second horizontal synchronization signal corresponding to the second cycle is supplied to the control circuit.

6. The device according to claim 5, wherein
the control circuit further includes counters configured to count the number of first horizontal synchronization signals and the number of second horizontal synchronization signals after a start of the second scan, respectively, and
in a case where one of the number of first horizontal synchronization signals and the number of second horizontal synchronization signals that are counted by the counters reaches a predetermined number, the control circuit is configured to cause the scanning circuit to start the first scan.

7. The device according to claim 6, wherein
in a case where a next driving operation is the first driving operation, the control circuit is configured to cause the scanning circuit to start the first scan in accordance with a count value of the counter configured to count the number of first horizontal synchronization signals, and
in a case where the next driving operation is the second driving operation, the control circuit is configured to cause the scanning circuit to start the first scan in accordance with a count value of the counter configured to count the number of second horizontal synchronization signals.

8. The device according to claim 5, wherein
a vertical synchronization signal indicating a timing of the driving operation is supplied to the control circuit, and
the control circuit is configured to generate, from the vertical synchronization signal, a signal indicating a timing of starting at least one of the first scan and the second scan using one of the first horizontal synchronization signal and the second horizontal synchronization signal.

9. The device according to claim 5, further comprising a first generation circuit configured to generate the first horizontal synchronization signal, and a second generation circuit configured to generate the second horizontal synchronization signal.

10. The device according to claim 1, wherein the scanning circuit does not include a divider circuit or a multiplier circuit.

11. The device according to claim 1, wherein at the time of switching the driving operation from the first driving operation to the second driving operation, the scanning circuit is configured to start the first scan by the second driving operation before the second scan by the first driving operation ends.

12. The device according to claim 1, wherein the scanning circuit is configured to start, before the second scan by one driving operation of the driving operation ends, the first scan by a next driving operation of the one driving operation.

13. The device according to claim 1, wherein
each of the plurality of pixels includes a first photoelectric conversion element and a second photoelectric conversion element,
in one of the first driving operation and the second driving operation, a signal generated by one of the first photoelectric conversion element and the second photoelectric conversion element and a signal generated by both the first photoelectric conversion element and the second photoelectric conversion element are read out, and
in the other of the first driving operation and the second driving operation, a signal generated by one of the first photoelectric conversion element and the second photoelectric conversion element is not read out but a signal generated by both the first photoelectric conversion element and the second photoelectric conversion element is read out.

14. A photoelectric conversion system comprising:
the photoelectric conversion device according to claim 1; and
a signal processor configured to process a signal output from the photoelectric conversion device.

15. A moving body including a driving device, comprising:
a control device including the photoelectric conversion device according to claim 1 and configured to control the driving device based on information obtained by the photoelectric conversion device.

16. A photoelectric conversion device comprising a plurality of pixels each including a photoelectric conversion element and arranged to form a plurality of rows, a scanning circuit configured to drive the plurality of pixels, and a control circuit,
wherein the scanning circuit is configured to perform a driving operation including a first scan of causing the plurality of pixels to start an accumulation operation on a row basis and a second scan of reading out signals from the plurality of pixels on a row basis after the first scan,
the driving operation includes a first driving operation and a second driving operation that are different in a length of a readout period of signals from one row in the second scan,
the control circuit is configured to supply, to the scanning circuit, a first synchronization signal for controlling the first scan and a second synchronization signal for controlling the second scan,
the scanning circuit is configured to drive the plurality of pixels on a row basis every time the first synchronization signal is supplied from the control circuit in the first scan, and
at the time of switching the driving operation from the first driving operation to the second driving operation, the control circuit is configured to switch, in accordance with a start of the first scan in the second driving operation, a cycle in which the first synchronization signal is supplied.

17. A method of driving a photoelectric conversion device including a plurality of pixels arranged to form a plurality of rows and a scanning circuit configured to drive the plurality of pixels, comprising:
performing a driving operation including a first scan, performed by the scanning circuit, of causing the plurality of pixels to start an accumulation operation on a row basis, and a second scan, performed by the scanning circuit, of reading out signals from the plurality of pixels on a row basis after the first scan; and
supplying, to the scanning circuit, a first synchronization signal for controlling the first scan and a second synchronization signal for controlling the second scan,
wherein the driving operation includes a first driving operation and a second driving operation that are different in a length of a readout period of signals from one row in the second scan, and
a relationship between a cycle of the first synchronization signal and the second synchronization signal supplied to the scanning circuit in the first driving operation and a cycle of the first synchronization signal and the second synchronization signal supplied to the scanning circuit in the second driving operation is a relationship of a non-integer multiple or a non-integral submultiple.

18. A method of driving a photoelectric conversion device including a plurality of pixels each including a photoelectric conversion element and arranged to form a plurality of rows, and a scanning circuit configured to drive the plurality of pixels, comprising:
performing a driving operation including a first scan, performed by the scanning circuit, of causing the plurality of pixels to start an accumulation operation on a row basis, and a second scan, performed by the scanning circuit, of reading out signals from the plurality of pixels on a row basis after the first scan; and
supplying, to the scanning circuit, a first synchronization signal for controlling the first scan and a second synchronization signal for controlling the second scan,
wherein the driving operation includes a first driving operation and a second driving operation that are different in a length of a readout period of signals from one row in the second scan,
the scanning circuit drives the plurality of pixels on a row basis every time the first synchronization signal is supplied in the first scan, and
the driving operation is switched from the first driving operation to the second driving operation by switching, in accordance with a start of the first scan in the second driving operation, a cycle in which the first synchronization signal is supplied.

* * * * *